US008919425B2

(12) United States Patent
Han

(10) Patent No.: US 8,919,425 B2
(45) Date of Patent: Dec. 30, 2014

(54) FLOW CONTROL VALVE AND HEAT EXCHANGER EQUIPPED WITH SAME

(75) Inventor: Seong Seok Han, Daejeon (KR)

(73) Assignee: Halla Visteon Climate Control Corporation, Daejeon (KR)

( * ) Notice: Subject to any disclaimer, the term of this patent is extended or adjusted under 35 U.S.C. 154(b) by 1008 days.

(21) Appl. No.: 12/552,304

(22) Filed: Sep. 2, 2009

(65) Prior Publication Data

US 2010/0051228 A1 Mar. 4, 2010

(30) Foreign Application Priority Data

Sep. 2, 2008 (KR) .................. 10-2008-0086103
Sep. 26, 2008 (KR) .................. 10-2008-0094563
Aug. 25, 2009 (KR) .................. 10-2009-0078485
Aug. 25, 2009 (KR) .................. 10-2009-0078488

(51) Int. Cl.
F28F 27/02 (2006.01)
F16L 53/00 (2006.01)
F16K 11/072 (2006.01)
F28D 1/04 (2006.01)
F28D 1/053 (2006.01)
F28F 9/02 (2006.01)

(52) U.S. Cl.
CPC ............ *F16K 11/072* (2013.01); *F28D 1/0443* (2013.01); *F28D 1/05375* (2013.01); *F28F 9/0209* (2013.01)
USPC ......... 165/101; 165/103; 62/525; 137/599.14

(58) Field of Classification Search
CPC . F28F 27/02; F28F 2250/02; F24F 2012/007; F25B 39/02; F25B 5/02; B60H 1/00485; F16K 11/22

USPC ........ 165/153, 100–103; 137/625.43, 625.46, 137/599.14, 599.08, 601.16, 601.17, 594; 62/525
See application file for complete search history.

(56) References Cited

U.S. PATENT DOCUMENTS

| 2,910,284 | A | * | 10/1959 | Wittler ........................ 432/54 |
| 5,566,881 | A | * | 10/1996 | Inoue et al. ............. 137/599.14 |
| 5,687,764 | A | * | 11/1997 | Tanaka et al. ............ 137/625.43 |
| 5,794,845 | A | * | 8/1998 | Ito et al. ................. 237/12.3 B |
| 5,927,326 | A | * | 7/1999 | Hiejima et al. .......... 137/601.16 |
| 6,109,301 | A | * | 8/2000 | Pfetzer .................... 137/599.14 |
| 6,116,264 | A | * | 9/2000 | Bachmann et al. ........... 137/240 |
| 6,799,631 | B2 | * | 10/2004 | Acre .............................. 165/103 |
| 7,284,595 | B2 | * | 10/2007 | Maeda et al. ................ 165/103 |
| 7,461,687 | B2 | * | 12/2008 | Han et al. ..................... 165/103 |
| 7,775,263 | B2 | * | 8/2010 | Han ............................ 165/144 |
| 2008/0099184 | A1 | * | 5/2008 | Han ............................ 165/103 |

FOREIGN PATENT DOCUMENTS

| JP | 04-365616 | 12/1992 |
| JP | 09-328012 | 12/1997 |
| JP | 2000-180087 | 6/2000 |

* cited by examiner

*Primary Examiner* — Leonard R Leo
(74) *Attorney, Agent, or Firm* — Lowe Hauptman & Ham, LLP

(57) ABSTRACT

A heat exchanger divided into two regions through which a heat exchange medium is flowed and an inlet side and an outlet side are integrally formed so as to simplify a construction thereof using a header tank of a double-tube structure type, and in which a flow control valve having a single body is disposed at one side of the heat exchanger so as to facilely control an amount of the heat exchange medium bypassed or flowed into each region.

25 Claims, 12 Drawing Sheets

Fig. 1 – Prior Art
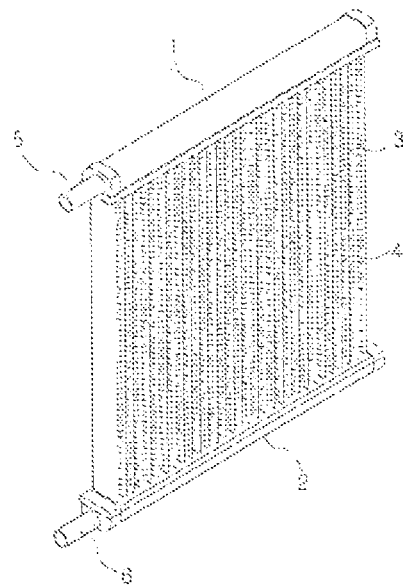
Fig. 2 – Prior Art
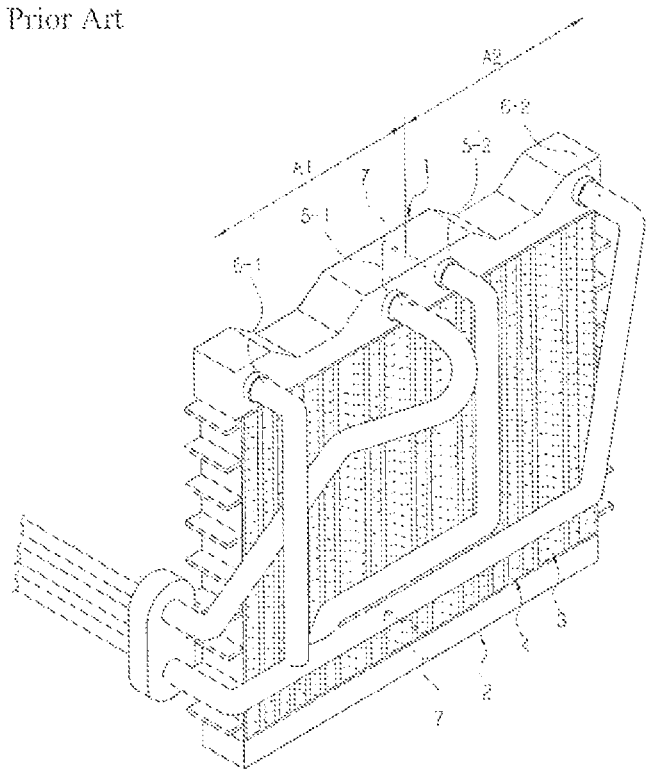

Fig. 3 – Prior Art
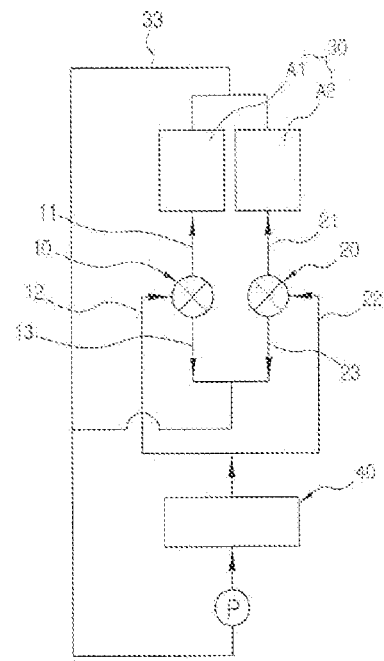
Fig. 4
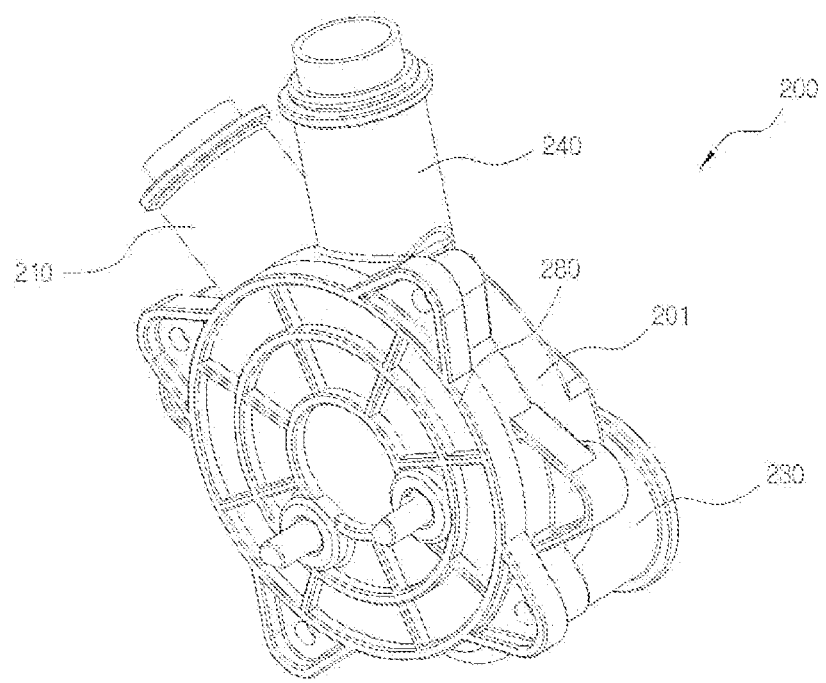

Fig. 13
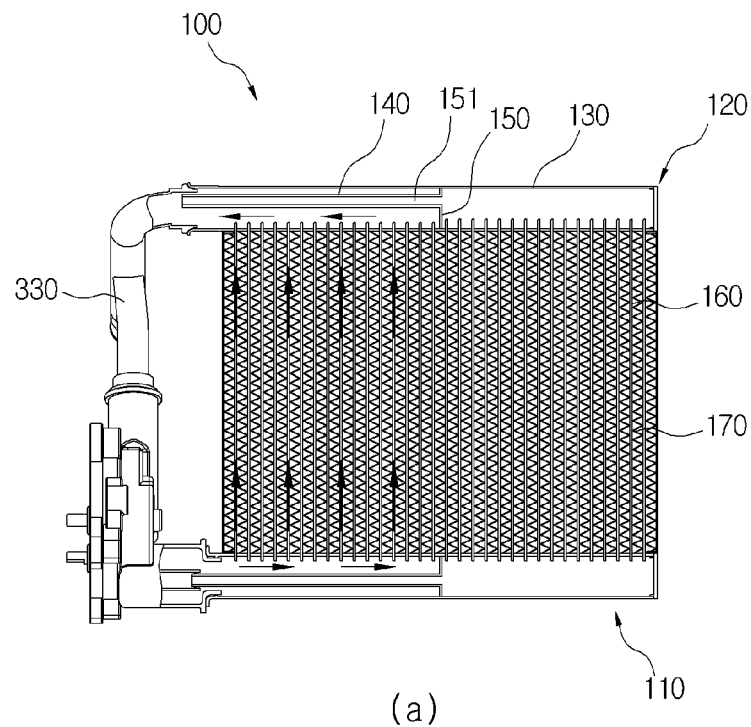
(a)
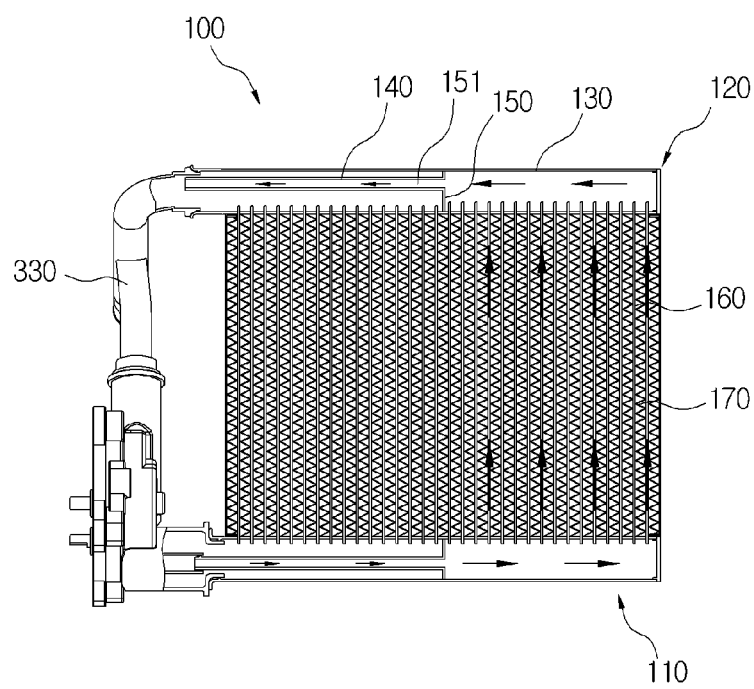
(b)

FLOW CONTROL VALVE AND HEAT EXCHANGER EQUIPPED WITH SAME

BACKGROUND OF THE INVENTION

1. Field of the Invention

The present invention relates to a flow control valve and a heat exchanger equipped with the same, wherein the heat exchanger is divided into two regions through which heat exchange medium is flowed and an inlet side and an outlet side are integrally formed so as to simplify a construction thereof using a header tank of a double-tube structure type; and, more particularly, to a flow control valve which is disposed at one side of a heat exchanger so as to facilely control an amount of the heat exchange medium bypassed or flowed into each region according to a temperature set by a user, and a heat exchanger equipped with the same.

2. Description of Related Art

Recently, in the automobile industry, as the concern for environment and energy has been increased, there has been research on the improvement of fuel efficiency, and research and development efforts for smaller size, lighter weight and high functioning has been steadily made to satisfy various demands of customers.

Meanwhile, the heat exchanger is a component of an air conditioning apparatus and functions to absorb heat from one side and then radiate the heat to the other side between two environments having a difference in temperature, thereby cooling or heating air and thus controlling the temperature in a vehicle.

FIG. 1 shows a general heat exchanger. The heat exchanger, as shown in FIG. 1, includes a first header tank 1 and a second header tank 2 which are disposed in parallel so as to be spaced apart from each other in a distance; an inlet pipe 5 and an outlet pipe 6 which are formed at the first header tank 1 or the second header tank 2; a tube 3 which is fixed to both ends of the first and second header tank 1 and 2 so as to form a passage of heat exchange medium; and a fin 4 which is interposed between the tubes 3.

In the heat exchanger shown in FIG. 1, the heat exchange medium introduced through the inlet pipe is heat-exchanged with external air while flowing through the passage including the tube, and then discharged through the outlet pipe. However, since the heat exchange medium is flowed through an entire region of the heat exchanger, it is impossible to control temperature at a particular part in a vehicle, i.e., a left or right side in the vehicle.

In order to solve the above-mentioned problem, there has been proposed a dual type heat exchanger as shown in FIG. 2.

As shown in FIG. 2, the dual type heat exchanger includes a first header tank 1 and a second header tank 2 which are disposed in parallel so as to be spaced apart from each other in a distance; a tube 3 which is fixed to both ends of the first and second header tank 1 and 2 so as to form a passage of heat exchange medium; and a fin 4 which is interposed between the tubes 3, wherein a baffle 7 is provided in the first and second header tanks 1 and 2 so as to partition a center portion of the first and second header tanks 1 and 2 in a length direction, so that an entire region thereof is divided into a first heat exchanging region A1 and a second heat exchanging region A2. The dual type heat exchanger further includes a first inlet pipe 5-1 and a first outlet pipe 6-1 which are formed at the first header tank 1 or the second header tank 2 forming the first heat exchanging region A1 so as to introduce or discharge heat exchange medium into/from the first heat exchanging region A1; and a second inlet pipe 5-2 and a second outlet pipe 6-2 which are formed at the first header tank 1 or the second header tank 2 forming the second heat exchanging region A2 so as to introduce or discharge heat exchange medium into/from the second heat exchanging region A2.

The dual type heat exchanger has an advantage in that the air temperature exhausted to a driver side and a passenger side can be differently controlled by individually controlling an amount of the heat exchange medium introduced into the divided first and second heat exchanging region according to a temperature individually set by a user. However, as shown in FIG. 2, the first inlet and outlet pipes are formed at the first heat exchanging region and the second inlet and outlet pipes are formed at the second heat exchanging region, and thus a space for forming the pipes is needed. Such space is served as an obstacle factor to minimize a side of the heat exchanger, and also since the dual type heat exchanger has a complicated structure, it is hard to manufacture it.

Meanwhile, there has been proposed a method of driving the dual type heat exchanger in Japanese Patent Laid-Open No. 1997-328012 (entitled "Flow control device and heating system with the same"), which is schematically illustrated in FIG. 3.

The heating system includes a heat exchanger 30 having a first heat exchanging region A1 and a second heat exchanging region A2; a first valve 10 having a first transferring part 12 which is connected with a heat exchange medium supplying part 40 so as to transfer heat exchange medium from the heat exchange medium supplying part 40, a first inlet part 11 which supplies the heat exchange medium to the first heat exchanging region A1, and a first bypassing part 13 which allows the heat exchange medium to be not transferred to the first heat exchanging region A1 but discharged; and a second valve 20 having a second transferring part 22 which is connected with the heat exchange medium supplying part 40 so as to transfer heat exchange medium from the heat exchange medium supplying part 40, a second inlet part 21 which supplies the heat exchange medium to the second heat exchanging region A2, and a second bypassing part 23 which allows the heat exchange medium to be not transferred to the second heat exchanging region A2 but discharged.

Herein, the heat exchange medium passing through the first and second heat exchanging regions A1 and A2 is moved through a discharging part 33 to the heat exchange medium supplying part 40, and the first bypassing part 13 and the second bypassing part 23 are communicated with the discharging part 33.

In the above-mentioned heating system, the amount of the heat exchanging medium transferred to the first and second heat exchanging regions is individually controlled by using the first and second valve. However, in order to operate the heating system, many components such as the first transferring part, the second transferring part, the first inlet part, the second inlet part, the first bypassing part and the second bypassing part are need. Thus, there is a problem that the components occupy much space in an engine room due to a complicated structure thereof.

Specially, in case that it is applied to the heat exchanger as shown in FIG. 2, the first inlet pipe of the heat exchanger is the first inlet part, and the second inlet pipe of the heat exchanger is the second inlet part, and the first and second outlet pipes and the first and second bypassing parts are connected with the discharging part. Therefore, the structure thereof is further complicated, and thus the above-mentioned problem becomes further serious.

Further, since the first and second valves are circular ball valves and function to connect each port by rotation thereof and also to disconnect other ports with its edge portion, there is limitation in a size of the valve. And since the ball valve has a large volume and a wide contacting surface, large driving force is needed.

Furthermore, in case that the ball valve is deformed or a sealing member is thermally fused by the hot heat exchange medium flowed in the heat exchanger, it is difficult to operate it.

SUMMARY OF THE INVENTION

An embodiment of the present invention is directed to providing a flow control valve which is disposed at one side of a heat exchanger so as to facilely control an amount of the heat exchange medium bypassed or flowed into each region according to a temperature set by a user, wherein the heat exchanger is divided into two regions through which heat exchange medium is flowed and an inlet side and an outlet side are integrally formed so as to simplify a construction thereof using a header tank of a double-tube structure type; and a heat exchanger equipped with the same.

To achieve the object of the present invention, the present invention provides a flow control valve, including a main body 201 provided with a first port 210 which is connected with a supplying pipe 310 of a heat exchange medium supplying part 110, second and third ports 220 and 230 which are respectively connected with first and second heat exchanging regions A1 and A2 of a heat exchanger 100 so that heat exchange medium introduced through the first port 210 is independently flowed in each of the first and second heat exchanging regions A1 and A2, a fourth port 240 which is connected with a discharging pipe 320 so as to discharge the heat exchange medium bypassed and discharged from the heat exchanger 100, a first flowing part 251 in which the heat exchange medium is flowed and which is communicated with a part of the first port 210, a second flowing part 252 through which the fourth port 240 is passed and which is communicated with the rest of the first port 210, a third flowing part 253 which is connected with the second and third ports 220 and 230, a fourth flowing part 254 which is surrounded by the first to third flowing parts 251, 252 and 253 and connected with the fourth port 240, a partition wall 202 which partitions the first to fourth flowing parts 251, 252, 253 and 254, a first communicating hole 261 which is formed at a portion of the partition wall 202 defining the first and third flowing parts 251 and 253, a second communicating hole 262 which is formed at a portion of the partition wall 202 defining the first and fourth flowing parts 251 and 254, a third communicating hole 263 which is formed at a portion of the partition wall 202 defining the fourth and second flowing parts 254 and 252, and a fourth communicating hole 264 which is formed at a portion of the partition wall 202 defining the second and third flowing parts 252 and 253; a first plate valve 271 which is provided at the first flowing part 251 so as to selectively open and close the first and second communicating holes 261 and 262; and a second plate valve 272 which is provided at the second flowing part 252 so as to selectively open and close the third and fourth communicating holes 263 and 264.

Preferably, the flow control valve 200 is formed so that the first port 210 is equally divided by the partition wall 202 and then communicated with each of the first and second flowing parts 251 and 252, and the partition wall 202 is extended in the fourth flowing part 254 so as to equally divide the fourth port 240 and partition the fourth flowing part 254 into two parts 254-1 and 254-2, such that the heat exchange medium introduced through the second communicating hole 262 into the first flowing part 251 and the heat exchange medium introduced through the third communicating hole 263 into the second flowing part 252 are independently separated from each other, and the partition wall 202 is extended so as to partition the third flowing part 253 into two parts 253-1 and 253-2, and the second port 220 is communicated with one part 253-1 of the third flowing part 253, and the third port 230 is communicated with the other part 253-2 of the third flowing part 253.

Preferably, the third port 230 and the second port 220 are formed into a double tube type structure in which the second port 220 is included in the third port 230, and the second and third ports 220 and 230 are formed to be protruded to a lower surface of the main body 201.

Preferably, the main body 201 is formed with a plate valve installing part 255 in which the first and second plate valves 271 and 272 provided at the first and second flowing parts 251 and 252 are installed.

Preferably, the partition wall 202 is vertically formed on a lower surface of the main body 201 so as to be closely contacted with the first and second plate valves 271 and 272 when the first and second plate valves 271 and 272 are rotated.

Preferably, an upper surface of the main body 201 is opened so that the first and second plate valves 271 and 272 are inserted from an upper side, and the flow control valve further includes a cover 280 which closes the opened upper surface of the main body 201 and fixes the first and second plate valves 271 and 272 and also further includes a sealing member 290 which is interposed between the main body 201 and the cover 280.

Further, the present invention provides a heat exchanger 100 with the flow control valve 200 as described above.

Preferably, the heat exchanger includes first and second header tanks 110 and 120 respectively provided with an outer pipe 130 in which a plurality of tube inserting holes 133 that the tube 181 is inserted are formed at regular intervals in an outer surface of the outer pipe 130, and one end of the outer pipe 130 is opened so as to form an inlet part 131 or an outlet part 132 through which heat exchange medium is introduced or discharged, and the other end thereof is closed, an inner pipe 140 which is formed into a hollow pipe type and inserted into a side of the inlet part 131 or the outlet part 132 of the outer pipe 130 and of which one end is formed with an inlet part 141 or an outlet part 142 through which the heat exchange medium is introduced or discharged and the other end is coupled with a baffle 150, and the baffle 150 which separates between the inner pipe 140 and the outer pipe 130 and of which a part is hollowed so as to be communicated with the inner space of the inner pipe 140; a tube 181 of which both ends are fixed to the first and second header tanks 110 and 120 and which is partitioned by the baffle 150 so as to form first and second heat exchanging regions A1 and A2 in which the heat exchange medium is independently flowed; and a fin 182 which is interposed between the tubes 181.

Preferably, the inner pipe 140 and a communicating hole 151 are formed to be biased to one side of the outer pipe 130 so that the heat exchange medium flowed between the inner and outer pipes 140 and 130 is smoothly moved to the tube 181.

Preferably, the inlet part 131, 141 and the outlet part 132, 142 are formed at the same side of the first and second header tanks 110 and 120, and the flow control valve is assembled to one side of the heat exchanger 100.

Preferably, the second port 220 is formed with an inner pipe fixing part 221 which is coupled with the inlet part 141 of the inner pipe 140 so that the heat exchange medium is supplied to the inner space of the inner pipe 140, and the third port 230 is formed with an outer pipe fixing part 231 which is coupled with the inlet part 131 of the outer pipe 130 so that the heat exchange medium is supplied between the inner pipe 140 and the outer pipe 130.

Preferably, the inlet part 141 or the outlet part 142 of the inner pipe 140 is formed to be more protruded to an outside of the heat exchanger 100 than the inlet part 131 or the outlet part 132 of the outer pipe 130.

Preferably, the inlet part 131, 141 or the outlet part 132, 142 is formed with a protrusion 160, which is formed to be continuously protruded at an outer or inner surface thereof, in order to increase coupling force with an inner pipe fixing part 221, an outer pipe fixing part 231 or an outlet part fixing part 241, and the inlet part 131, 141 or the outlet part 132, 142 is further provided with a sealing member 170 when being coupled with the inner pipe fixing part 221, the outer pipe fixing part 231 or the outlet part fixing part 241.

Preferably, a discharging pipe 320 for discharging the heat exchange medium is directly connected to the outlet part 132 of the outer pipe 130, and the fourth port 240 of the flow control valve 200 is connected with the discharging pipe 320.

Furthermore, the present invention provides a flow control valve, including a main body 201 provided with a first port 210 which is connected with a supplying pipe 310 of a heat exchange medium supplying part 110, second and third ports 220 and 230 which are respectively connected with first and second heat exchanging regions A1 and A2 of a heat exchanger 100 so that heat exchange medium introduced through the first port 210 is independently flowed in each of the first and second heat exchanging regions A1 and A2, a fourth port 240 which is connected with a discharging pipe 320 so as to discharge the heat exchange medium bypassed and discharged from the heat exchanger 100, and a partitioning means 202 which partitions an inner space of the main body 201 so that the heat exchange medium introduced through the first port 210 is flowed to the second, third or fourth port 220, 230 or 240; a first flow controlling means 271 which controls an amount of the heat exchange medium introduced through the first port 210, which is flowed to the second or fourth port 220 or 240; and a second flow controlling means 272 which controls an amount of the heat exchange medium introduced through the first port 210, which is flowed to the third or fourth port 230 or 240.

Preferably, the inner space of the main body 201 is partitioned by the partitioning means 202 into a first flowing part 251 in which the heat exchange medium is flowed and which is communicated with a part of the first port 210, a second flowing part 252 through which the fourth port 240 is passed and which is communicated with the rest of the first port 210, a third flowing part 253 which is connected with the second and third ports 220 and 230, a fourth flowing part 254 which is surrounded by the first to third flowing parts 251, 252 and 253 and connected with the fourth port 240, and the partitioning means 202 comprises a first partition wall 202-1 for partitioning between the first and second flowing parts 251 and 252, a second partition wall 202-2 for partitioning between the second and third flowing parts 252 and 253, a third partition wall 202-3 for partitioning between the third and first flowing parts 253 and 251, a fourth partition wall 202-4 which connects the first and third partition walls 202-1 and 202-3 so as to partition between the first and fourth flowing parts 251 and 254, a fifth partition wall 202-5 which connects the first and second partition walls 202-1 and 202-2 so as to partition between the second and fourth flowing parts 252 and 254, and a sixth partition wall 202-6 which connects the second and third partition walls 202-2 and 202-3 so as to partition between the third and fourth flowing parts 253 and 254, and the third partition wall 202-3 is formed with a first communicating hole 261 which communicates the first and third flowing part 251 and 253, the fourth partition wall 202-4 is formed with a second communicating hole 262 which communicates the first and fourth flowing part 251 and 254, the fifth partition wall 202-5 is formed with a third communicating hole 263 which communicates the fourth and second flowing part 254 and 252, and the second partition wall 202-2 is formed with a fourth communicating hole 264 which communicates the second and third flowing part 252 and 253, the first flow controlling means 271 is a first plate valve 271 so as to selectively open and close the first and second communicating holes 261 and 262, and the second flow controlling means 272 is a second plate valve 272 so as to selectively open and close the third and fourth communicating holes 263 and 264.

Preferably, the flow control valve further includes a seventh partition wall 202-7 which partitions the fourth flowing part 154 so as to separate the heat exchange medium introduced through the second communicating hole 262 from the first flowing part 251 to the fourth flowing part 254 and the heat exchange medium introduced through the third communicating hole 263 from the second flowing part 252 to the fourth flowing part 254 from each other and then discharge the heat exchange medium through fourth port 240.

BRIEF DESCRIPTION OF THE DRAWINGS

FIG. 1 is a perspective view of a conventional heat exchanger.

FIG. 2 is a perspective view of a conventional dual type heat exchanger.

FIG. 3 is a schematic view of a conventional heating system.

FIGS. 4 to 7 are a perspective view, an exploded perspective view, an upper front view and a lower front view of a flow control valve in accordance with the present invention.

FIGS. 11 to 13 are a perspective view and a cross-sectional view of a heat exchanger in accordance with an embodiment of the present invention, and a schematic view illustrating a flow of heat exchange medium therein.

[Detailed Description of Main Elements]

| | |
|---|---|
| 100: heat exchanger | |
| A1: first heat exchanging region | |
| A2: second heat exchanging region | |
| 110: first header tank | 120: second header tank |
| 130: outer pipe | 131: inlet part |
| 132: outlet part | 133: tube inserting hole |
| 140: inner pipe | 141: inlet part |
| 142: outlet part | |
| 150: baffle | 151: communicating hole |
| 160: protrusion | 170: sealing member |
| 181: tube | 182: fin |

-continued

[Detailed Description of Main Elements]

| | |
|---|---|
| 200: flow control valve | |
| 201: main body | |
| 202: partition wall(202-1~202-8) | |
| 210: first port | |
| 220: second port | 221: inner pipe fixing part |
| 230: third port | 231: outer pipe fixing part |
| 240: fourth port | 241: outlet part fixing part |
| 242: discharging pipe fixing part | |
| 251: first flowing part | 252: second flowing part |
| 253: third flowing part (253-1, 253-2) | |
| 254: fourth flowing part (254-2, 254-2) | |
| 255: plate valve installing part | |
| 261: first communicating hole | |
| 262: second communicating hole | |
| 263: third communicating hole | |
| 264: fourth communicating hole | |
| 271: first plate valve | 271: second plate valve |
| 280: cover | |
| 290: sealing member | |
| 300: heat exchange medium supplying part | |
| 310: supplying pipe | 320; discharging pipe |
| 330: bypassing pipe | |

DESCRIPTION OF SPECIFIC EMBODIMENTS

The advantages, features and aspects of the invention will become apparent from the following description of the embodiments with reference to the accompanying drawings, which is set forth hereinafter.

Figure 5:
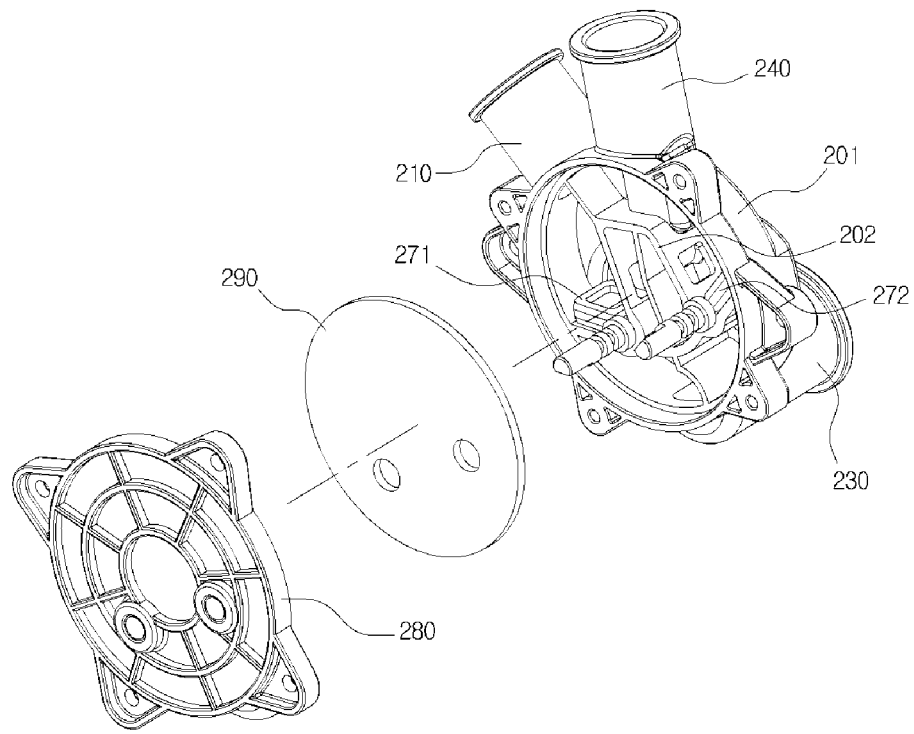
Figure 6:
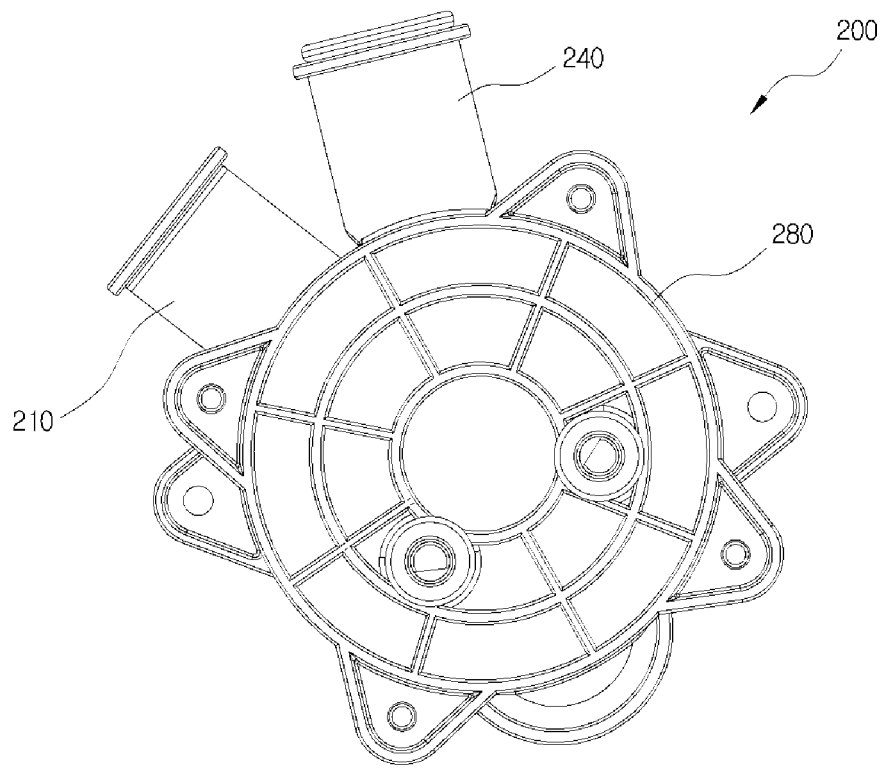
Figure 7:
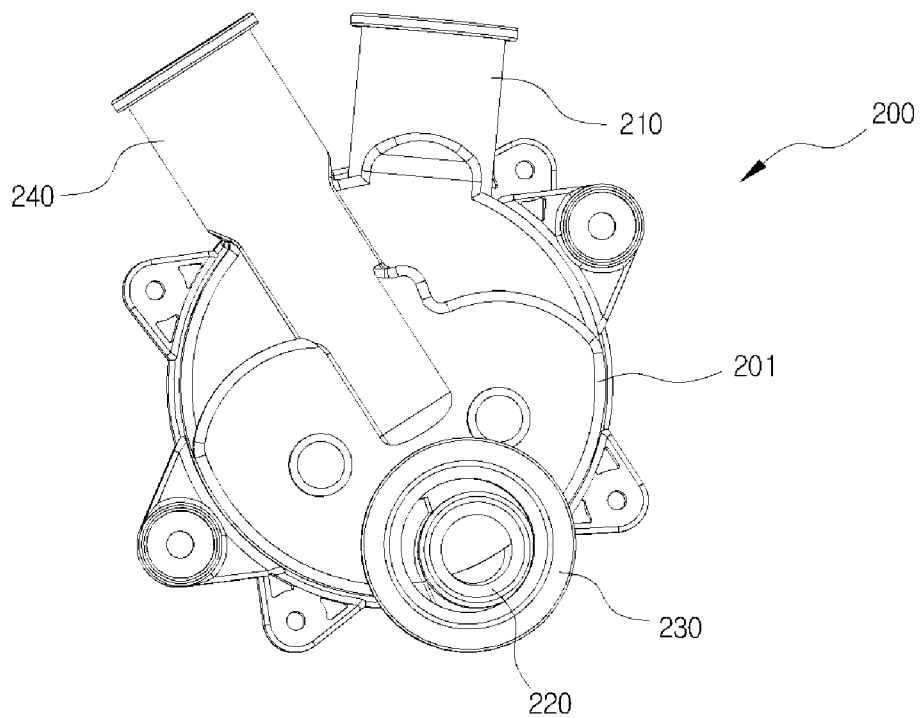
Figure 8:
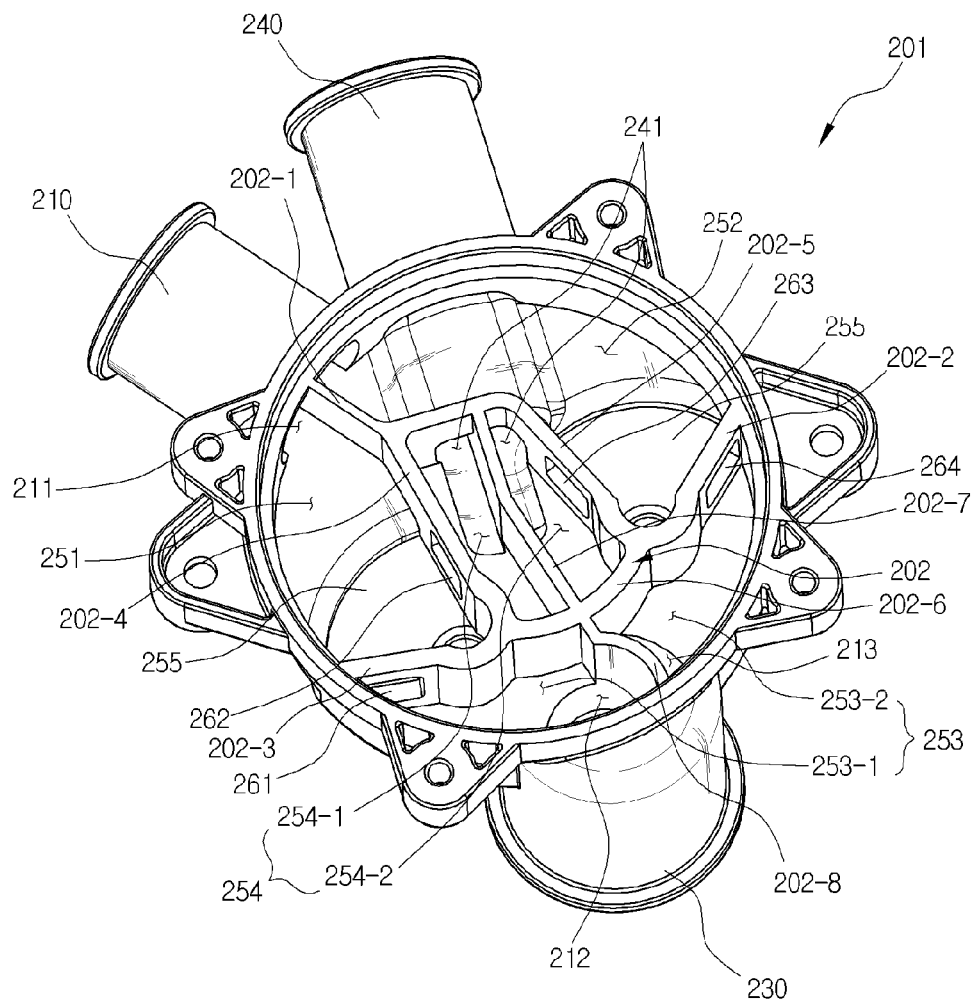
FIG. 8 is a perspective view of a main body of the flow control valve in accordance with the present invention.
Figure 9:
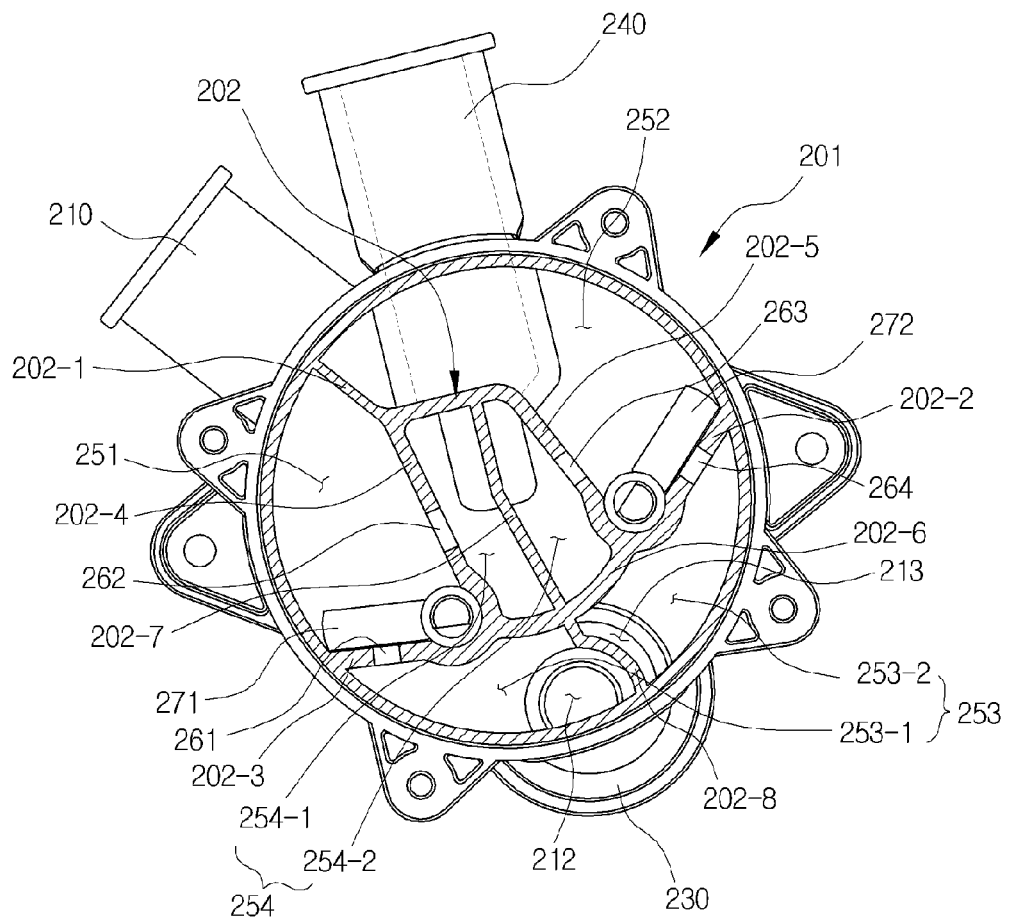
FIG. 9 is an upper front view of the main body, a first plate valve and a second plate valve of the flow control valve in accordance with the present invention.
Figure 10:
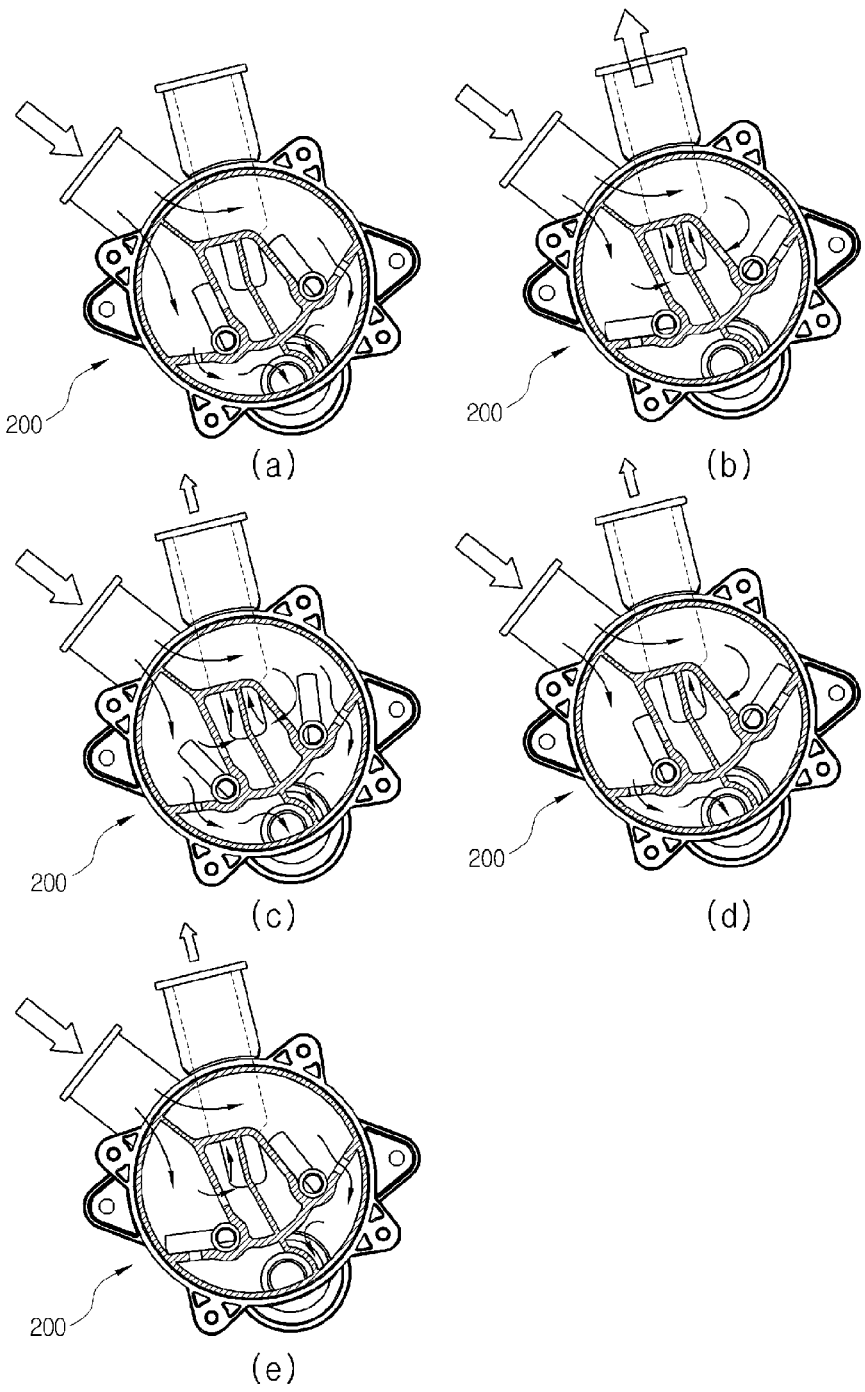
FIG. 10 is a schematic view illustrating a flow of heat exchange medium in the flow control valve in accordance with the present invention.
Figure 11:
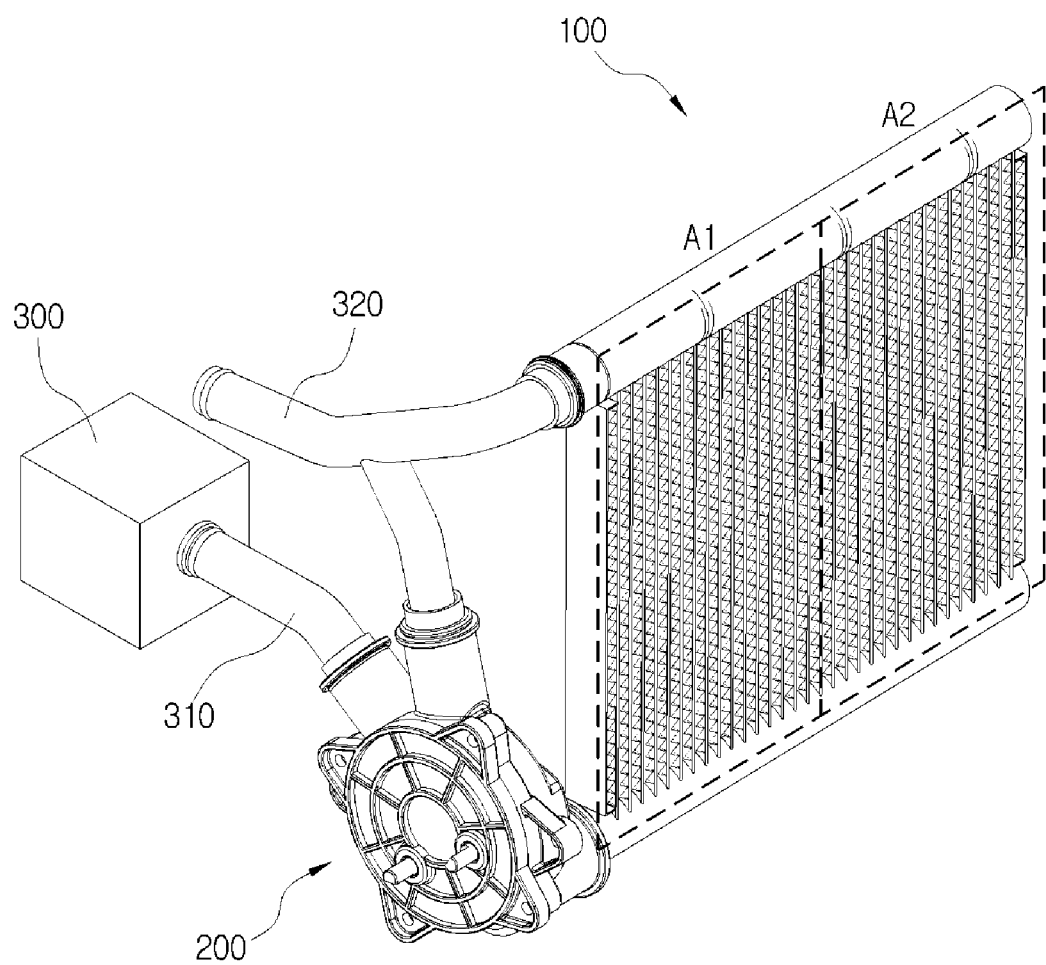
Figure 12:
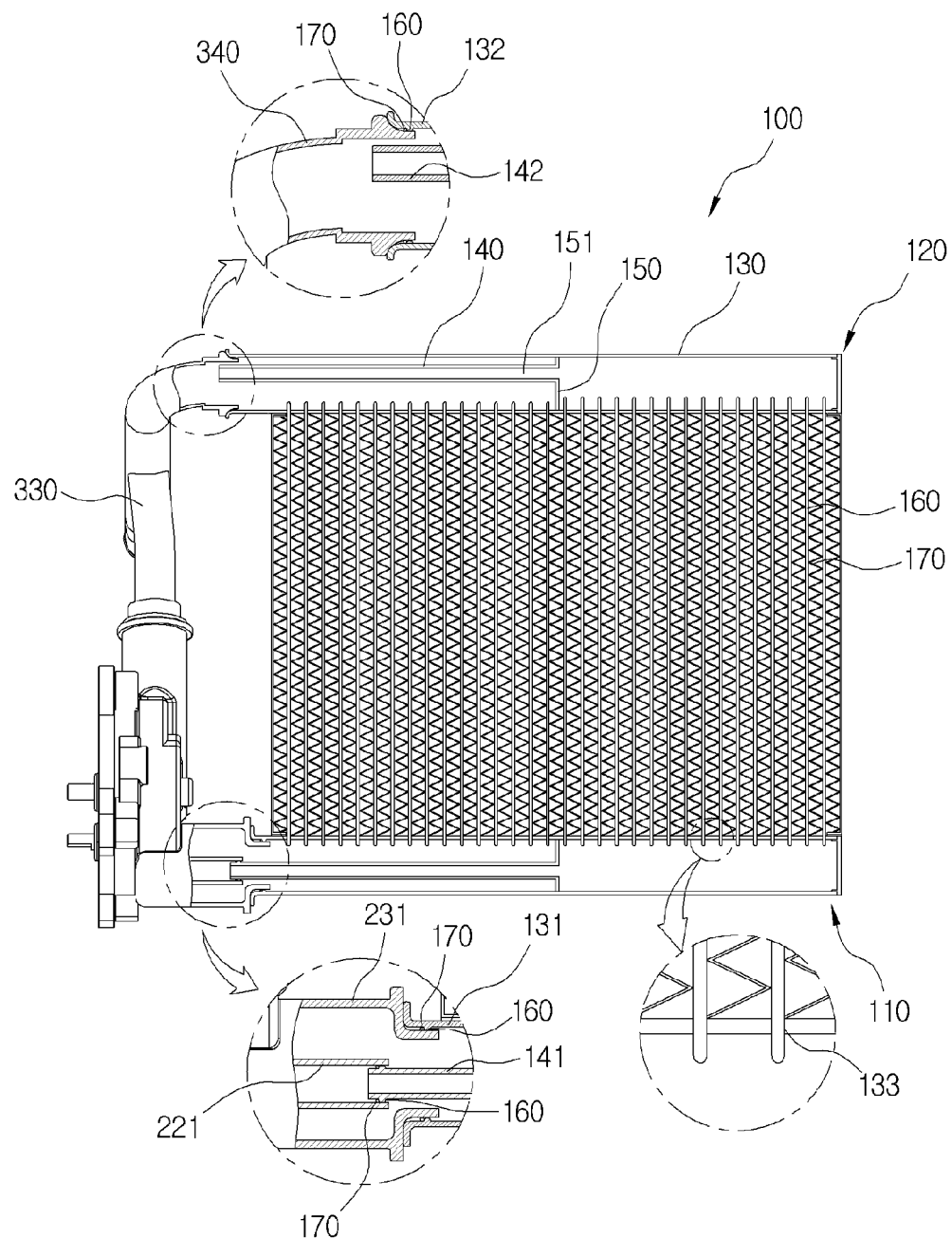
Figure 14:
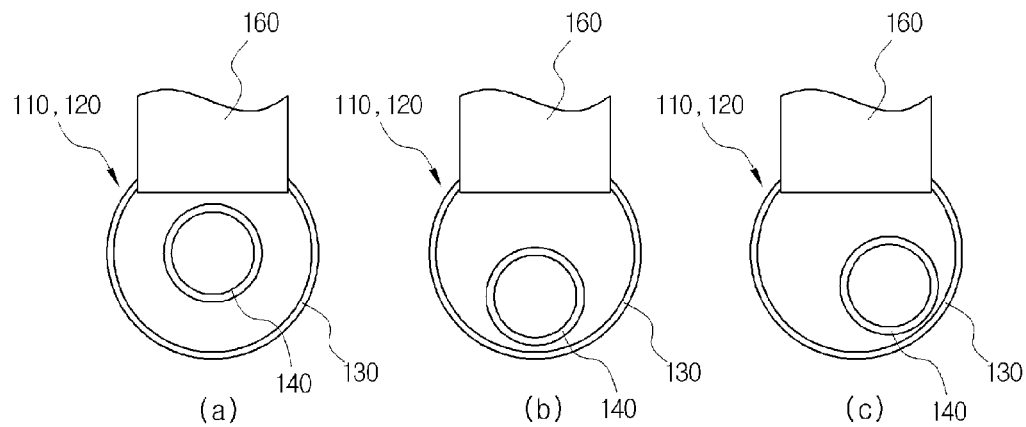
FIG. 14 is a partial side cross-sectional view of the heat exchanger in accordance with the present invention.
Figure 15:
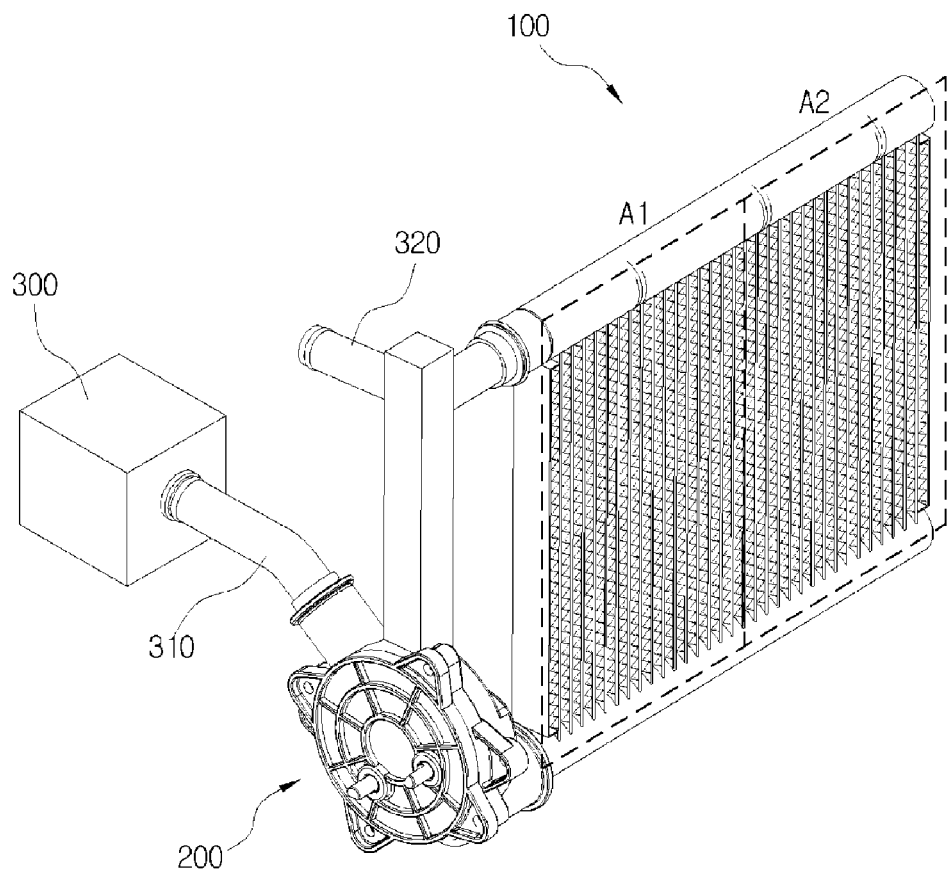
FIGS. 15 and 16 are a perspective view and a cross-sectional view of the heat exchanger in accordance with another embodiment of the present invention.
Figure 16:
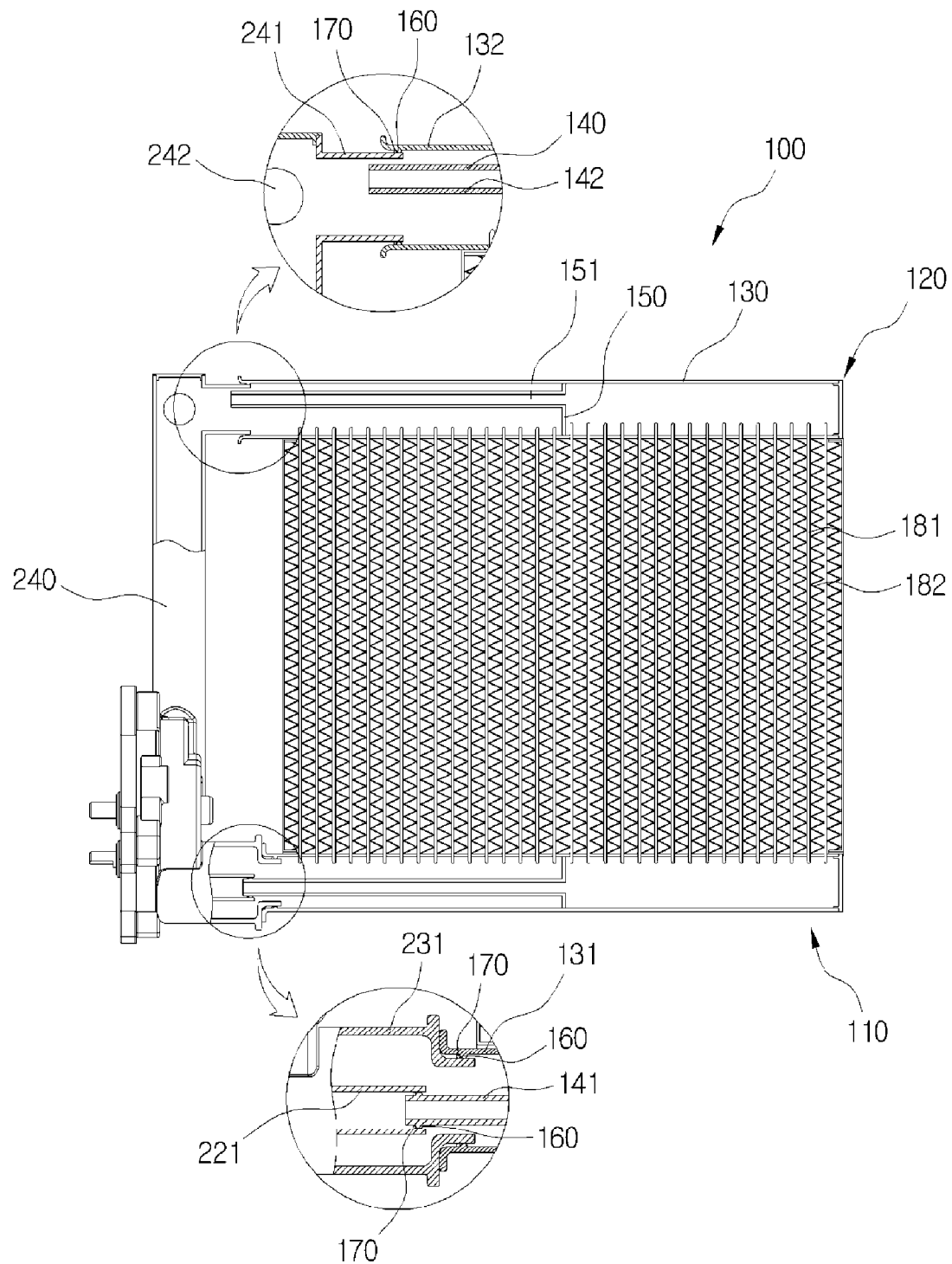

FIGS. 4 to 7 are a perspective view, an exploded perspective view, an upper front view and a lower front view of a flow control valve in accordance with the present invention, FIG. 8 is a perspective view of a main body of the flow control valve in accordance with the present invention, FIG. 9 is an upper front view of the main body, a first plate valve and a second plate valve of the flow control valve in accordance with the present invention, FIG. 10 is a schematic view illustrating a flow of heat exchange medium in the flow control valve in accordance with the present invention, FIGS. 11 to 13 are a perspective view and a cross-sectional view of a heat exchanger in accordance with an embodiment of the present invention, and a schematic view illustrating a flow of heat exchange medium therein, FIG. 14 is a partial side cross-sectional view of the heat exchanger in accordance with the present invention, and FIGS. 15 and 16 are a perspective view and a cross-sectional view of the heat exchanger in accordance with another embodiment of the present invention.

A flow control valve 200 of the present invention is connected with a heat exchanger 100 having a first heat exchanging region A1 and a second heat exchanging region A2 through which heat exchange medium is independently flowed so that an amount of the heat exchange medium bypassed or introduced into the first heat exchanging region A1 and the second heat exchanging region A2. The flow control valve 200 includes a main body 201, a first plate valve 271 and a second plate valve 272.

The main body 201 has first to fourth flowing parts 251, 252, 253 and 254 at an inside thereof, and also has first to fourth ports 210, 220, 230 and 240 at an outer surface thereof.

The first port 210 is formed at the outer surface of the main body 201 so as to be connected with a supplying pipe 310 of a heat exchange medium supplying part 300, and the heat exchange medium supplied from the heat exchange medium supplying part 300 is flowed into the main body 201 through the supplying pipe 310 and the first port 210.

The second port 220 and the third port 230 function to supply the heat exchange medium to the first heat exchanging region A1 and the second heat exchanging region A2, respectively. As shown in FIG. 11, ends of the second port 220 and the third port 230 may be directly connected to one side of a header tank of the heat exchanger 100, or may be connected through first and second inlet pipes.

The fourth port 240 is connected to a discharging pipe 320 through which the heat exchange medium discharged from the heat exchanger 100 is discharged, such that the heat exchange medium introduced through the first port 210 into the main body 201 is not passed through the heat exchanger 100 but bypassed.

In case that the fourth port 240 and the discharging pipe 320 of the heat exchanger 100 are disposed to be spaced apart from each other due to a position of the flow control valve 200, a bypassing pipe 330 may be further provided so as to connect the fourth port 240 and the discharging pipe 320.

An inner space of the main body 201 is partitioned into first to the fourth flowing parts 251, 252, 253 and 254 by partition walls 202, and first to fourth communicating holes 261, 262, 263 and 264 are formed to communicate the first to the fourth flowing parts 251, 252, 253 and 254.

The fourth flowing part 254 is positioned at a center portion of the main body 201 so as to be surrounded by the first to third flowing parts 251, 252 and 253.

More detailedly, the first flowing part 251 is communicated with a part of the first port 210, and the second flowing part 252 is communicated with the rest part of the first port 210 and includes the fourth port 240 therein, and the third flowing part 253 is connected with the second and third ports 220 and 230, and the fourth flowing part 254 is surrounded by the first to third flowing parts 251, 252 and 253 and also connected with the fourth port 240.

Herein, the fourth port 240 is formed to be inserted into the main body 201, and also passed through the second flowing part 252 to be communicated with the fourth flowing part 254.

In other words, an inner space of the second flowing part 252 is not communicated with the fourth port 240, and thus the heat exchange medium in the second flowing part 252 is independently flowed regardless of the heat exchange medium introduced into the fourth port 240 through the fourth flowing part 254.

The first communicating hole 261 is formed at one (a third partition wall 202-3) of partition walls 202, which partitions the first and third flowing parts 251 and 253, and the second communication hole 262 is formed at the other one (a fourth partition wall 202-4) which partitions the first and fourth flowing parts 251 and 254, and the third communication hole 263 is formed at another one (a fifth partition wall 202-5) which partitions the fourth and second flowing parts 254 and 252, and the fourth communication hole 264 is formed at yet another one (a second partition wall 202-2) which partitions the second and third flowing parts 252 and 253.

The first to fourth communicating holes 261, 262, 263 and 264 are to connect the heat exchange medium flowed in the first to fourth flowing parts 251, 252, 253 and 254, thereby controlling the flow of the heat exchange medium.

Preferably, each of the first to fourth flowing parts 251, 252, 253 and 254 has a similar capacity in which the heat exchange medium is flowed, and the partition wall 202 (the first partition wall 202-1) for partitioning the first and second flowing parts 251 and 252 equally divides the first port 210.

In other words, the heat exchange medium introduced through the first port 210 is equally divided into left and right side by the partition wall 202 so that an amount of the supplied heat exchange medium is equally distributed.

The heat exchange medium introduced through the first port 210 is firstly distributed into the first and second flowing parts 251 and 252 by the partition wall 202.

The partition wall 202 may be formed into various types so as to partition the first to the fourth flowing parts 251, 252, 253 and 254, and as shown in FIGS. 8 and 9, the partition wall 202 may include first to eighth partition wall 202-1, 202-2, 202-3, 202-4, 202-5, 202-6, 202-7 and 202-8.

The first partition wall 202-1 partitions the first and second flowing parts 251 and 252, and the second partition wall 202-2 partitions the second and third flowing parts 252 and 253, and the third partition wall 202-3 partitions the third and first flowing parts 253 and 251.

Further, the fourth partition wall 202-4 connects the first and third partition walls 202-1 and 202-3 so as to partition the first and fourth flowing parts 251 and 254, and the fifth partition wall 202-5 connects the first and second partition walls 202-1 and 202-2 so as to partition the second and fourth flowing parts 252 and 254, and the sixth partition wall 202-6 connects the second and third partition walls 202-2 and 202-3 so as to partition the third and fourth flowing parts 253 and 254.

That is, the first flowing part 251 is defined by an inner surface of the main body 201, the first partition wall 202-1, the fourth partition wall 202-4 and the third partition wall 202-3. The second flowing part 252 is defined by an inner surface of the main body 201, the first partition wall 202-1, the fifth partition wall 202-5 and the second partition wall 202-2. The third flowing part 253 is defined by an inner surface of the main body 201, the second partition wall 202-2, the sixth partition wall 202-6 and the third partition wall 202-3. The fourth flowing part 254 is defined by the fourth partition wall 202-4, the fifth partition wall 202-5 and the sixth partition wall 202-6.

The heat exchange medium in the first flowing part 251 may be flowed through the first communicating hole 261 to the third flowing part 253-1, or flowed through the second communicating hole 262 to the fourth flowing part 254-1. In order to control the flow of the heat exchange medium, a first plate valve 271 is formed at a space of the first flowing part 251.

The first plate valve 271 may supply the heat exchange medium introduced into the first flowing part 251 to the second heat exchanging region A2 of the heat exchanger 100 through the first communicating hole 261, (one side of) the third flowing part 253-1 and the second port 220, or bypass through the second communicating hole 262, the fourth flowing part 254-1 and the fourth port 240.

The heat exchange medium in the second flowing part 252 may be flowed through the fourth communicating hole 264 to the third flowing part 253-2, or flowed through the third communicating hole 263 to the fourth flowing part 254-2. In order to control the flow of the heat exchange medium, a second plate valve 272 is formed at a space of the second flowing part 252.

The second plate valve 272 may supply the heat exchange medium introduced into the second flowing part 252 to the first heat exchanging region A1 of the heat exchanger 100 through the fourth communicating hole 264, (the other side of) the third flowing part 253-2 and the third port 230, or bypass through the third communicating hole 263, the fourth flowing part 254-2 and the fourth port 240.

The first and second plate valve 271 and 272 are respectively rotated around a shaft so that plate portions are closely contacted with the partition wall 202 so as to open and close the first to fourth communicating holes 261, 262, 263 and 264. When comparing with the conventional ball valve, it is possible to operate the valve with small driving force, and also it is possible to reduce the possibility of deformation, thereby increasing durability of the valve.

Preferably, the partition wall 202 is vertically formed at a lower surface of the main body 201 so as to be closely contacted with the first and second plate valves 271 and 272 when they are rotated. The main body 201 is formed with a plate valve installing part 255 in which the first and second plate valves 271 and 272 provided at the first and second flowing parts 251 and 252 are rotatably installed, and thus it is possible to facilely carry out an assembling operation.

Preferably, the fourth flowing part 254 is partitioned into two parts 254-1 and 254-2 by the extended partition wall 202 so as to independently separate the heat exchange medium introduced from the first flowing part 251 through the second communicating hole 262 and the heat exchange medium introduced from the second flowing part 252 through the third communicating hole 263.

More detailedly, in the main body 201, the inner space of the fourth flowing part 254 surrounded by the first and third flowing parts 251, 252 and 253 is partitioned by the seventh partition wall 202-7. In the drawing, for example, the seventh partition wall 202-7 is formed to connect the fifth partition wall 202-5 and the sixth partition wall 202-6.

In other words, the inner space of the fourth flowing part 254 is partitioned into the part 254-1 communicated with the first flowing part 251 and the part 254-2 communicated with the second flowing part 252. The fourth port 240 is equally divided into a left part and a right part by the partition wall 202.

In the flow control valve 200 of the present invention, since the fourth flowing part 254 is partitioned into the two parts 254-1 and 254-2 by the extended partition wall 202, it is prevented that the heat exchange medium introduced from the first flowing part 251 and the heat exchange medium introduced from the second flowing part 252 have an influence on each other, or the heat exchange medium in the first flowing part 251 is passed through the fourth flowing part 254 and then flowed back into the second flowing part 252, or the heat exchange medium in the second flowing part 252 is passed through the fourth flowing part 254 and then flowed back into the first flowing part 251.

The seventh partition wall 202-7 for partitioning the inner space of the fourth flowing part 254 is formed to equally divide the fourth port 240 into the left and right sides, such that the heat exchange medium in the fourth flowing part 254 is smoothly discharged through the fourth port 240.

Further, in the main body 201, the partition wall 202 is extended so as to partition the third flowing part 253 into two parts 253-1 and 253-2, such that the second port 220 is connected with one part 253-1 of the third flowing part and the third port 230 is connected with the other part 253-2 thereof.

In the main body 201, the third flowing part 253 is partitioned by the eighth partition wall 202-8 which is extended from the sixth partition wall 202-6 for partitioning the third and fourth flowing parts 253 and 254 to an inner surface side of the main body 201.

Therefore, the heat exchange medium introduced through the first flowing part 251 and the heat exchange medium introduced through the second flowing part 252 are supplied to each of the first heat exchanging region A1 and the second heat exchanging region A2 of the heat exchanger 100 without being mixed with each other.

In other words, the eighth partition wall 202-8 for partitioning the space of the third flowing part 253 separates the heat exchange medium introduced through the first flowing part 251 and the first communicating hole 261 and the heat exchange medium introduced through the second flowing part 252 and the fourth communicating hole 264. Thus, in the flow control valve 200, the heat exchange medium introduced into the third flowing part 253 through the first flowing part 251 and the first communicating hole 261 and is supplied through the second port 220 to the second heat exchanging region A2 of the heat exchanger 100, and the heat exchange medium introduced into the third flowing part 253 through the second flowing part 252 and the fourth communicating hole 264 is supplied through the third port 230 to the first heat exchanging region A1. Therefore, the heat exchange medium is smoothly and independently supplied to each of the two regions of the heat exchanger 100 without being mixed with each other.

Herein, the third port 230 may be formed into a double tube type including the second port 220.

The second port 220 is communicated with a desired area of one part 253-1 of the third flowing part through a second hollow hole 212, and the third port 230 of the double tube type including the second port 220 is formed at an outer side of the main body 201 so as to be communicated with a desired area of the other part 253-2 of the third flowing part through a third hollow hole 213.

Referring to FIGS. 8 and 9, the second hollow hole 212 is formed at one part 253-1 of the third flowing part 253 so as to be connected with the second port 220, and the third hollow hole 213 is formed at the other part 253-2 of the third flowing part 253 partitioned by the partition wall 202 so as to surround the second port 220.

In case that the second and third ports 220 and 230 have the above-mentioned structures, it is possible to simultaneously form the second and third ports 220 and 230 using a single core.

That is, in order to form the main body 201, a lower mold, an upper mold having a shape corresponding to the partition wall 202, a core for forming the first port 210, a core for forming the second and third ports 220 and 230, and a core for forming the fourth port 240 may be used.

At this time, the core for forming the first port 210 is formed to be contacted with the upper mold, thereby forming the first hollow hole 211 for connecting the first port 210 and the first flowing part 251. An end of the core for forming the second and third ports 220 and 230 is formed to be contacted with the upper mold for forming one part 253-1 and the other part 253-2 of the third flowing part 253, thereby forming the second and third hollow holes 212 and 213. The core for forming the fourth port 240 is inserted into the fourth flowing part 254 of the main body 201 so as to be contacted with the upper mold forming the upper mold for forming the fourth flowing part 254, thereby forming the fourth hollow hole 214.

Therefore, in the flow control valve 200 of the present invention, the main body 201 may be facilely formed without a separate slide core by basically using an upper mold, a lower mold and three cores for forming each port.

Further, in the flow control valve 200 of the present invention, the second and third ports 220 and 230 are formed to be protruded to a lower side of the main body 201, (in case that a cover 280 is provided, an upper side of the main body 201 is a side that the cover 280 is provided, and a lower side of the main body 201 is a side that the cover 280 is not provided), and the second and third ports 220 and 230 may be directly coupled to a header tank area of the heat exchanger 100, which is connected with the flow control valve 200.

In order to directly connect the second and third ports 220 and 230 with the header tank of the heat exchanger 100, the second and third ports 220 and 230 are formed into the double tube type so that outer and inner regions thereof are respectively communicated with the first heat exchanging region A1 and the second heat exchanging region A2.

In the flow control valve 200 of the present invention, the inner space of the main body 201 is partitioned into the first to fourth flowing parts 251, 252, 253 and 254 so as to equally distribute the heat exchange medium supplied to the first and second heat exchanging regions A1 and A2 from the first port 210. Since the first and second plate valves 271 and 272 are independently operated, the heat exchange medium is stably supplied to the two heat exchanging regions or bypassed.

A driving means (not shown) for driving the first and second plate valves 271 and 272 is provided at an outside of the main body 201 so as to control an amount of the heat exchange medium supplied to the heat exchanger 100 according to left and right temperatures set by a user, thereby providing a comfortable temperature to the user.

The driving means may be an actuator, and the heat exchanger 100 of the present invention may include various means for independently operating the first and second plate valves.

In the flow control valve 200 of the present invention, it is preferable that an upper surface of the main body 201 is opened so as to facilely manufacture the main body 201 and also to facilely install the first and second plate valves, and a cover 280 for closing the opened upper surface is further provided.

The cover 280 fixes the first and second plate valves 271 and 272. Also the cover 280 is detachably provided to allow the maintenance thereof.

The flow control valve 200 of the present invention may further include a sealing member 290 between the main body 201 and the cover 280.

In the drawing, the sealing member 290 is formed into a circular plate shape and formed with holes for installing the first and second plate valves 271 and 272. However, the sealing member 290 may be formed into a circular ring shape interposed between the main body 201 and the cover 280.

Referring to FIG. 10, a flow of the heat exchange medium will be fully described.

FIG. 10a shows a flow which equally supplies the heat exchange medium over an entire region of the heat exchanger 100. The heat exchange medium is separately introduced through the first port 210 to each of the first and second flowing parts 251 and 252. The heat exchange medium introduced into the first flowing part 251 is supplied to the second heat exchanging regions A2 through the first communicating hole 261, one part 253-1 of the third flowing part 253 and the second port 220 in a status that the first communicating hole 261 is opened and the second communicating hole 262 is closed by the first plate valve 271 of the first flowing part 251, and the heat exchange medium introduced into the second flowing part 252 is supplied to the first heat exchanging regions A1 through the fourth communicating hole 264, the other part 253-2 of the third flowing part 253 and the third port 230 in a status that the fourth communicating hole 264 is opened and the third communicating hole 263 is closed by the second plate valve 272 of the second flowing part 252.

FIG. 10b shows a flow of the heat exchange medium which is bypassed so as to be not supplied to the heat exchanger 100. The heat exchange medium is separately introduced through the first port 210 to each of the first and second flowing parts 251 and 252. The heat exchange medium introduced into the first flowing part 251 is discharged through the second communicating hole 262, one part 254-1 of the fourth flowing part 254 and the fourth port 240 in a status that the first communicating hole 261 is closed and the second communicating hole 262 is opened by the first plate valve 271, and the heat exchange medium introduced into the second flowing part 252 is discharged through the third communicating hole 263, the other part 254-2 of the fourth flowing part 254 and the fourth port 240 in a status that the fourth communicating hole 264 is closed and the third communicating hole 263 is opened by the second plate valve 272.

FIG. 10c shows a flow in which a desired amount of the heat exchange medium is supplied to the heat exchanger 100 and the rest is bypassed. The first and second plate valve 271 and 272 are arranged to open all of the first to fourth communicating holes 261, 262, 263 and 264.

More detailedly, the heat exchange medium is separately introduced through the first port 210 to each of the first and second flowing parts 251 and 252. A part of the heat exchange medium introduced into the first flowing part 251 is supplied to the second heat exchanging region A2 through the first communicating hole 261, one part 253-1 of the third flowing part and the second port 220, and the rest is bypassed through the second communicating hole 262, one part 254-1 of the fourth flowing part and the fourth port 240. A part of the heat exchange medium introduced into the second flowing part 252 is supplied to the first heat exchanging region A1 through the fourth communicating hole 264, the other part 253-2 of the third flowing part and the third port 230, and the rest is bypassed through the third communicating hole 263, the other part 254-2 of the fourth flowing part and the fourth port 240.

FIG. 10d shows a flow in which the heat exchange medium is supplied only to the second heat exchanging region A2 of the heat exchanger 100. The heat exchange medium introduced into the first flowing part 251 is supplied to the second heat exchanging region A2 through the first communicating hole 261, one part 253-1 of the third flowing part and the second port 220 in the status that the first communicating hole 261 is opened and the second communicating hole 262 is closed by the first plate valve 271, and the heat exchange medium introduced into the second flowing part 252 is bypassed through the third communicating hole 263, the other part 254-2 of the fourth flowing part and the fourth port 240 in the status that the fourth communicating hole 264 is closed and the third communicating hole 263 is opened by the second plate valve 272.

FIG. 10e shows a flow in which the heat exchange medium is supplied only to the first heat exchanging region A1 of the heat exchanger 100. The heat exchange medium introduced into the first flowing part 251 is bypassed through the second communicating hole 262, one part 254-1 of the fourth flowing part and the fourth port 240 in the status that the first communicating hole 261 is closed and the second communicating hole 262 is opened by the first plate valve 271, and the heat exchange medium introduced into the second flowing part 252 is supplied to the first heat exchanging region A1 through the fourth communicating hole 264, the other part 253-1 of the third flowing part and the third port 230 in the status that the fourth communicating hole 264 is opened and the third communicating hole 263 is closed by the second plate valve 272.

As described above, in the flow control valve 200 of the present invention, the inner space of the main body 201 is partitioned into the first to fourth flowing parts 251, 252, 253 and 254, and the first and second plate valves 271 and 272 are provided to be independently operated so as to control the flow of the heat exchange medium, whereby the heat exchange medium is stably supplied to the two heat exchanging regions or bypassed.

The heat exchanger 100 of the present invention is a dual type heat exchanger 100 in which the first and second heat exchanging regions A1 and A2. The heat exchanger 100 is provided with the flow control valve 200 as described above.

Hereinafter, a construction of the heat exchanger 100 of the present invention and a coupling structure between the heat exchanger 100 and the flow control valve 200 will be described fully.

The heat exchanger 100 of the present invention includes a first header tank 110 and a second header tank 120 which are comprised of an outer pipe 130, an inner pipe 140 and a baffle 150; a tube 181; and a fin 182.

The first and second header tanks 110 and 120 are formed in parallel to be spaced apart from each other in a desired distance, and the baffle 150 is provided at a center portion in a length direction so as to partition the center portion into two regions.

The first header tank 110 or the second header tank 120 is formed of the outer pipe 130 and the inner pipe 140.

The outer pipe 130 is a basic body for forming the first header tank 110 or the second header tank 120. A plurality of tube inserting holes 133 in which the tube 181 is inserted are formed at regular intervals in an outer surface of the outer pipe 130. One end of the outer pipe 130 is opened so as to form an inlet part 131 or an outlet part 132 through which the heat exchange medium is introduced or discharged, and the other end is closed.

In the drawing, for example, the inlet part 131 is formed at a left side of the first header tank 110, and the outlet part 132 is formed at a left side of the second header tank 120.

The inner pipe 140 is formed into a hollow pipe type and inserted into the outer pipe 130. At this time, the inner pipe 140 is inserted into a side of the outer pipe 130 that the inlet part 131 or the outlet part 132 of the outer pipe 130 is formed, and the inner pipe 140 has a length which is extended to a part partitioned by the baffle 150.

Since an inner space of the inner pipe 140 is isolated from a space between the inner pipe 140 and the outer pipe 130 by the inner pipe 140, one end of the inner pipe 140 is opened so as to form an inlet part 141 or an outlet part 142 through which the heat exchange medium is introduced or discharged, and the other end is closed.

An inner side of the baffle 150 coupled with the inner pipe 140 forms a communicating hole 151 through which the inner space of the inner pipe 140 is communicated with a region which is partitioned by the baffle 150 and in which the inner pipe 140 is not formed.

That is, in the heat exchanger 100 of the present invention, since the first or second header tank 110, 120 is partitioned into the first and second heat exchanging regions A1 and A2 by the outer pipe 130, the inner pipe 140 and the baffle 150, it is possible to remove a plurality of pipes for introducing or discharging the heat exchange medium to/from each space, thereby increasing space efficiency.

The heat exchanger 100 of the present invention may be configured so that only one of the first and second header tanks 110 and 120 has a double tube type structure formed of the outer pipe 130 and the inner pipe 140. However, in order to reduce a half of the pipe structures and also reduce the possibility that the heat exchange medium in each space is mixed with each other, as shown in the drawings, it is preferable that both of the first and second header tanks 110 and 120 have the double tube type structure formed of the outer pipe 130 and the inner pipe 140.

FIG. 13 shows a flow in which the heat exchange medium is flowed through the first heat exchanging region A1 and the second heat exchanging region A2. As shown in FIG. 13a, the heat exchange medium flowed in the first heat exchanging region A1 is introduced through a space between the inner pipe 140 and the outer pipe 130 of the first header tank 110, and moved in a length direction to the region which is partitioned by the baffle 150, and moved to the second header tank 120 through the plurality of tubes 181 formed at one side, and then discharged through a space between the inner pipe 140 and the outer pipe 130 of the second header tank 120.

As shown in FIG. 13b, the heat exchange medium flowed in the second heat exchanging region A2 is moved in turn through an inner space of the inner pipe 140 of the first header tank 110, the communicating hole 151 of the baffle 150, and an inner space of the outer pipe 130 in which the inner pipe 140 is not formed, and moved to the second header tank 120 through the tube 181 communicated with the inner space of the outer pipe 130 in which the inner pipe 140 is not formed, and then discharged through an inner space of the outer pipe 130 of the second header tank 120 in which the inner pipe 140 is not formed, the communicating hole 151 of the baffle 150 and the inner space of the inner pipe 140.

In the drawing, the outer and inner pipes 130 and 140 have a circular shape in section. However, in the heat exchanger 100 of the present invention, the outer and inner pipes 130 and 140 forming the first header tank 110 or the second header tank 120 may have various shapes in section, such as an oval shape and a polygonal shape.

FIG. 14 is a view showing a position relationship between the inner pipe 140 and the outer pipe 130, wherein FIG. 14a shows an example in which central axes of the inner and outer pipes 140 and 130 are identical with each other, and FIG. 14b shows an example in which the inner pipe 140 is disposed to be biased to a lower side of the outer pipe 140, and FIG. 14c shows an example in which the inner pipe 140 is disposed to be biased to a lower right side of the outer pipe 140.

In the second heat exchanging region A2 which is partitioned by the baffle 150 and in which the inner pipe 140 is not formed (a right region of the drawing), the heat exchange medium is smoothly flowed from the header tank 110, 120 to the tube 181 or from the tube 181 to the header tank 110, 120.

However, in the first heat exchanging region A1 in which the inner pipe 140 and the outer pipe 130 are formed together, if the inner pipe 140 and an end of the tube 181 are formed to be adjacent to each other because of insertion of the tube 181 into the tube inserting hole 133 of the outer pipe 130, the inner space becomes narrow and thus the heat exchange medium may be not smoothly moved to/from the tube 181.

Particularly, in case that the outer pipe 130 has a small diameter, the above-mentioned problem may be further serious. Preferably, the inner pipe 140 and the communicating hole 151 of the baffle 150 are disposed to be biased to one side so that the heat exchange medium flowing between the inner and outer pipes 140 and 130 is smoothly moved to the tube 181.

In the heat exchanger 100 of the present invention, one side of the header tank 110 (a left lower side in the drawing) forms the inlet part 131, 141 of the outer pipe 130 and the inner pipe 140. In order to remove a separate inlet pipe, the outlet part 132, 142 and the inlet part 131, 141 formed at the first header tank 110 and the second header tank 120 are formed at the same side, and the flow control valve 200 is coupled to one side of the heat exchanger 100.

That is, in the heat exchanger 100, the first and second heat exchanging regions A1 and A2 are independently formed by using the header tank 110, 120 formed of the inner and outer pipes 140 and 130. And since the heat exchanger 100 is directly coupled to the second and third ports 220 and 230 of the flow control valve 200, it is possible to simplify the manufacturing and assembling processes.

In order to directly connect the flow control valve 200 to the header tank, it is required that the second and third ports 220 and 230 is formed into a double tube type corresponding to the header tank 110 having the inner and outer pipes 140 and 130 of the double tube type structure (referring to FIGS. 7 to 9).

More detailedly, the second port 220 of the flow control valve 200 is formed with an inner pipe fixing part 221 which is coupled with the inlet part 141 of the inner pipe 140 so that the heat exchange medium is supplied to the inner space of the inner pipe 140. The third port 230 is formed with an outer pipe fixing part 231 which is coupled with the inlet part 131 of the outer pipe 130 so that the heat exchange medium is supplied between the inner pipe 140 and the outer pipe 130.

In other words, the inner pipe fixing part 221 is formed at an end of the second port 220 and coupled with the inlet part 141 formed at an end of the inner pipe 140. The outer pipe fixing part 231 is formed at an end of the third port 230 and coupled with the inlet part 131 formed at an end of the outlet pipe 130.

Since the heat exchanger 100 of the present invention is directly coupled with the inner and outer pipes 130 and 140 of the first header tank 110 using the flow control valve 200 of the double tube type structure in which the second port 220 is included in the third port 230, it is possible to increase the space efficiency.

In the heat exchanger 100 of the present invention, preferably, the inlet part 141 or the outlet part 142 of the inner pipe 140 is formed to be more protruded to an outside of the heat exchanger 100 (a left side in the drawing) than the inlet part 131 or the outlet part 132 of the outer pipe 130.

In the above-mentioned structure, when the inlet part 131, 141 is coupled with the flow control valve 200, the inner pipe 140 is firstly coupled and then the outer pipe 130 positioned at the outside is coupled, and thus it is facile to check the coupling state of the inner and outer pipes 140 and 130.

However, in case that the inner pipe 140 is formed to have the same length as the outer pipe 130 or formed to be more depressed to an inside than the outer pipe 130, it is difficult to check the coupling state although the outer pipe 130 is coupled.

As shown in FIGS. 15 and 16, in case that the fourth port 240 is extended and directly coupled with the outlet part 132, 142 of the inner and outer pipes 130 and 140 of the header tank, the inner pipe 140 at the side of the outlet part 132, 142 is formed to be further protruded to the outside so that the heat exchange medium flowed in the inner pipe 140 is facilely discharged, and thus it is possible to reduce a problem like a back flow. Therefore, in the heat exchanger 100, the inlet part 141 or the outlet part 142 of the inner pipe 140 is formed to be more protruded to the outside of the heat exchanger 100 than the inlet part 131 or the outlet part 132 of the outer pipe 130.

Since the outer pipe fixing part 231 of the third port 230 is formed to include the inner pipe fixing part 221 of the second port 220 therein, and the inlet part 141 of the inner pipe 140 is formed to be more protruded to the outside of the heat exchanger 100 than the inlet part 131 of the outer pipe 130, the outer pipe fixing part 231 is formed (in a length direction of the first heater tank 110 in the drawing) to have a longer length than the inner pipe fixing part 221.

Preferably, in order to increase coupling force, a protrusion 160 is further formed to be continuously protruded at an outer or inner surface of the outer pipe fixing part 231 and the inner pipe fixing part 221, and also a sealing member 182 is further provided upon the coupling.

In FIGS. 12 and 16, the inner pipe fixing part 221 has the protrusion 160 protruded at the outer surface thereof, and the outer pipe fixing part 231 has the protrusion 160 protruded at the inner surface thereof. However, the protrusion 160 may be formed into various shapes according to shapes of the second and third ports 220 and 230 of the flow control valve 200 and shapes of the inner and outer pipes 140 and 130.

The inner pipe fixing part 221 and the outer pipe fixing part 231 are formed to be corresponding to forming positions of the outer and inner pipes 130 and 140 forming the header tank 110, 120 in which the heat exchange medium is introduced.

As shown in FIGS. 11 to 13, the outlet part 132, 142 may be directly connected with a discharging pipe 320, and the fourth port 240 may be formed to be connected with the discharging pipe 320. As show in FIGS. 15 and 16, the fourth port 240 may be extended to be connected with the outlet part 132, 142.

In case that the fourth port 240 is extended, the fourth port 240 may be extended to a side that the outlet part 132 of the outer pipe 130 so as to form an outlet part fixing part 241 fixed with the outlet part 132 of the outer pipe 130 and a discharging pipe fixing part 242 fixed with the discharging pipe 320 through which the heat exchange medium is discharged, such that the heat exchange medium bypassed and flowed in the heat exchanger 100 is discharged.

The fourth port 240 has the outlet part fixing part 241 fixed with the outlet part 132 of the outer pipe 130 so that the heat exchange medium discharged between the outer and inner pipes 130 and 140 and discharged through the inner space of the inner pipe 140 is discharged through the discharging pipe 320 and the heat exchange medium bypassed through the fourth port 240 is also discharged through the discharging pipe 320.

In FIGS. 15 and 16, the fourth port 240 is formed into a rectangular tube. However, the fourth port 240 may be formed into a circular tube like in the rest ports 210, 220 and 230.

Like the inlet part 131, 141 of the first header tank 110 as well as the outlet part fixing part 241 fixed with the outlet part 132 of the outer pipe 130 are connected to the fourth port 240, the heat exchanger 100 of the present invention may have a portion which is coupled with the outlet part 142 of the inner pipe 140 so as to guide the heat exchange medium to the discharging pipe 320.

Preferably, the outlet part 132 of the outer pipe 130 is formed with the protrusion 160 protruded at the inner or outer surface in order to increase the coupling force with the outlet part fixing part 241, and the sealing member 170 is further provided.

According to the present invention as described above, since many pipe constructions for forming the dual type heat exchanger 100 is removed or simplified, it is possible to facilely manufacture the heat exchanger and also increase the space efficiency.

Further, it is possible to facilely control the amount of the heat exchange medium bypassed and supplied to each of the first and second heat exchanging regions A1 and A2 using the flow control valve 200 having a single body. Therefore, if the heat exchanger 100 of the present invention is used in an air conditioning apparatus for a vehicle, it is possible to independently control the temperature at left and right sides in the vehicle. And also if necessary, it is possible to bypass the heat exchange medium in a particular region of the heat exchanger 100 so that the heat exchange medium is not introduced therein, thereby providing a comfortable temperature to the user.

Therefore, since the flow control valve of the present invention has a simple structure for supplying the heat exchange medium to each of the two regions of the heat exchanger, it is possible to enhance space utilization and also facilely manufacture it.

Further, in the flow control valve of the present invention, the main body is divided into the first to fourth flowing parts, and each plate valve is independently operated so as not to exert an influence on the flowing of the separated heat exchange medium. And by using the plate valve, it is possible to reduce the possibility of deformation due to the hot heat exchange medium, thereby increasing durability thereof, and it is possible to enhance airtightness, thereby efficiently controlling the amount of the heat exchange medium.

Furthermore, in the heat exchanger of the present invention, it is possible to facilely form the first and second heat exchanging regions by forming the inlet or outlet side using the double-tube structure, and by using the flow control valve, it is possible to control the amount of the heat exchange medium bypassed or introduced into the first and second heat exchanging region according to a temperature individually set by a user, thereby providing a comfortable temperature to the user.

While the present invention has been described with respect to the specific embodiments, it will be apparent to those skilled in the art that various changes and modifications may be made without departing from the spirit and scope of the invention as defined in the following claims.

What is claimed is:

1. A flow control valve, comprising:
a main body provided with a first port which is connected with a supplying pipe of a heat exchange medium supplying part, second and third ports which are respectively connected with first and second heat exchanging regions of a heat exchanger so that heat exchange medium introduced through the first port is independently flowed in each of the first and second heat exchanging regions, a fourth port which is connected with a discharging pipe so as to discharge the heat exchange medium bypassed and discharged from the heat exchanger, a first flowing part in which the heat exchange medium is flowed and which is communicated with a part of the first port, a second flowing part through which the fourth port is passed and which is communicated with the rest of the first port, a third flowing part which is connected with the second and third ports, a fourth flowing part which is surrounded by the first to third flowing parts and connected with the fourth port, a partition wall which partitions the first to fourth flowing parts, a first communicating hole which is formed at a portion of the partition wall defining the first and third flowing parts, a second communicating hole which is formed at a portion of the partition wall defining the first and fourth flowing parts, a third communicating hole which is formed at a portion of the partition wall defining the fourth and second flowing parts, and a fourth communicating hole which is formed at a portion of the partition wall defining the second and third flowing parts;
a first plate valve which is provided at the first flowing part so as to selectively open and close the first and second communicating holes; and
a second plate valve which is provided at the second flowing part so as to selectively open and close the third and fourth communicating holes,
wherein the partition wall is formed so that the first port is equally divided by the partition wall and then communicated with each of the first and second flowing parts,
wherein the partition wall is extended into the fourth flowing part so as to equally divide the fourth port and partition the fourth flowing part, such that the heat exchange medium introduced through the second communicating hole into the first flowing part and the heat exchange medium introduced through the third communicating hole into the second flowing part are independently separated from each other, and wherein the partition wall is extended so as to partition the third flowing part into two parts, the second port being communicated with one part of the third flowing part and the third port being communicated with the other part of the third flowing part.

2. The flow control valve of claim 1, wherein the third port and the second port are formed into a double tube type structure in which the second port is included in the third port.

3. The flow control valve of claim 2, wherein the second and third ports are formed to be protruded to a lower surface of the main body.

4. The flow control valve of claim 3, wherein the main body comprises a plate valve installing part formed therein in which the first and second plate valves provided at the first and second flowing parts.

5. The flow control valve of claim 4, wherein the partition wall is vertically formed on a lower surface of the main body so as to be closely contacted with the first and second plate valves when the first and second plate valves are rotated.

6. The flow control valve of claim 5, wherein an upper surface of the main body is open so that the first and second plate valves are insertable from an upper side.

7. The flow control valve of claim 6, further comprising a cover which closes the opened upper surface of the main body and fixes the first and second plate valves.

8. The flow control valve of claim 7, further comprising a sealing member which is interposed between the main body and the cover.

9. A heat exchanger configured to receive a heat exchange medium supplied by the flow control valve, wherein the flow control valve comprises:

a main body provided with a first port which is connected with a supplying pipe of a heat exchange medium supplying part, second and third ports which are respectively connected with first and second heat exchanging regions of a heat exchanger so that heat exchange medium introduced through the first port is independently flowed in each of the first and second heat exchanging regions, a fourth port which is connected with a discharging pipe so as to discharge the heat exchange medium bypassed and discharged from the heat exchanger, a first flowing part in which the heat exchange medium is flowed and which is communicated with a part of the first port, a second flowing part through which the fourth port is passed and which is communicated with the rest of the first port, a third flowing part which is connected with the second and third ports, a fourth flowing part which is surrounded by the first to third flowing parts and connected with the fourth port, a partition wall which partitions the first to fourth flowing parts, a first communicating hole which is formed at a portion of the partition wall defining the first and third flowing parts, a second communicating hole which is formed at a portion of the partition wall defining the first and fourth flowing parts, a third communicating hole which is formed at a portion of the partition wall defining the fourth and second flowing parts, and a fourth communicating hole which is formed at a portion of the partition wall defining the second and third flowing parts;

a first plate valve which is provided at the first flowing part so as to selectively open and close the first and second communicating holes; and a second plate valve which is provided at the second flowing part so as to selectively open and close the third and fourth communicating holes, wherein the partition wall is formed so that the first port is equally divided by the partition wall and then communicated with each of the first and second flowing parts, wherein the partition wall is extended into the fourth flowing part so as to equally divide the fourth port and partition the fourth flowing part, such that the heat exchange medium introduced through the second communicating hole into the first flowing part and the heat exchange medium introduced through the third communicating hole into the second flowing part are independently separated from each other, and wherein the partition wall is extended so as to partition the third flowing part into two parts, the second port being communicated with one part of the third flowing part and the third port being communicated with the other part of the third flowing part.

10. The heat exchanger of claim 9, further comprising:

first and second header tanks respectively provided with an outer pipe in which a plurality of tube inserting holes that the tube is inserted are formed at regular intervals in an outer surface of the outer pipe, and one end of the outer pipe is opened so as to form an inlet part or an outlet part through which heat exchange medium is introduced or discharged, and the other end thereof is closed, an inner pipe which is formed into a hollow pipe type and inserted into a side of the inlet part or the outlet part of the outer pipe and of which one end is formed with an inlet part or an outlet part through which the heat exchange medium is introduced or discharged and the other end is coupled with a baffle, and the baffle which separates between the inner pipe and the outer pipe and of which a part is hollowed so as to be communicated with the inner space of the inner pipe;

a tube of which both ends are fixed to the first and second header tanks and which is partitioned by the baffle so as to form first and second heat exchanging regions in which the heat exchange medium is independently flowed; and a fin which is interposed between the tubes.

11. The heat exchanger of claim 10, wherein the inner pipe and a communicating hole are formed to be biased to one side of the outer pipe so that the heat exchange medium flowed between the inner and outer pipes is smoothly moved to the tube.

12. The heat exchanger of claim 10, wherein the inlet part and the outlet part are formed at the same side of the first and second header tanks.

13. The heat exchanger of claim 10, wherein the flow control valve is assembled to one side of the heat exchanger.

14. The heat exchanger of claim 13, wherein the second port is formed with an inner pipe fixing part which is coupled with the inlet part of the inner pipe so that the heat exchange medium is supplied to the inner space of the inner pipe, and the third port is formed with an outer pipe fixing part which is coupled with the outlet part of the outer pipe so that the heat exchange medium is supplied between the inner pipe and the outer pipe.

15. The heat exchanger of claim 14, wherein the inlet part or the outlet part of the inner pipe is formed to be more protruded to an outside of the heat exchanger than the inlet part or the outlet part of the outer pipe.

16. The heat exchanger of claim 13, wherein the inlet part or the outlet part is formed with a protrusion, which is formed to be continuously protruded at an outer or inner surface thereof, configured to increase coupling force with an inner pipe fixing part, an outer pipe fixing part or an outlet part fixing part.

17. The heat exchanger of claim 16, wherein the inlet part or the outlet part is further provided with a sealing member when being coupled with the inner pipe fixing part, the outer pipe fixing part or the outlet part fixing part.

18. The heat exchanger of claim 10, wherein a discharging pipe for discharging the heat exchange medium is directly connected to the outlet part of the outer pipe.

19. The heat exchanger of claim 10, wherein the fourth port of the flow control valve is connected with the discharging pipe.

20. A flow control valve, comprising:
a main body provided with a first port which is connected with a supplying pipe of a heat exchange medium supplying part, second and third ports which are respectively connected with first and second heat exchanging regions of a heat exchanger so that a heat exchange medium introduced through the first port is independently flowed in each of the first and second heat exchanging regions, a fourth port which is connected with a discharging pipe so as to discharge the heat exchange medium bypassed and discharged from the heat exchanger, and a partitioning means which partitions an inner space of the main body so that the heat exchange medium introduced through the first port is flowed to the second, third or fourth port;
a first flow controlling means which controls an amount of the heat exchange medium introduced through the first port, which is flowed to the second or fourth port; and
a second flow controlling means which controls an amount of the heat exchange medium introduced through the first port, which is flowed to the third or fourth port, and
wherein the inner space of the main body is partitioned by the partitioning means into a first flowing part in which the heat exchange medium is flowed and which is communicated with a part of the first port, a second flowing part through which the fourth port is passed and which is communicated with the rest of the first port, a third flowing part which is connected with the second and third ports, a fourth flowing part which is surrounded by the first to third flowing parts and connected with the fourth port, and
the partitioning means comprises a first partition wall for partitioning between the first and second flowing parts, a second partition wall for partitioning between the second and third flowing parts, a third partition wall for partitioning between the third and first flowing parts, a fourth partition wall which connects the first and third partition walls so as to partition between the first and fourth flowing parts and, a fifth partition wall which connects the first and second partition walls so as to partition between the second and fourth flowing parts, and a sixth partition wall which connects the second and third partition walls so as to partition between the third and fourth flowing parts,
the third partition wall is formed with a first communicating hole which communicates the first and third flowing part, the fourth partition wall is formed with a second communicating hole which communicates the first and fourth flowing part, the fifth partition wall is formed with a third communicating hole which communicates the fourth and second flowing part, and the second partition wall is formed with a fourth communicating hole which communicates the second and third flowing part,
the first flow controlling means is a first plate valve so as to selectively open and close the first and second communicating holes, and the second flow controlling means is a second plate valve so as to selectively open and close the third and fourth communicating holes.

21. The flow control valve of claim 20, further comprising a seventh partition wall which partitions the fourth flowing part so as to separate the heat exchange medium introduced through the second communicating hole from the first flowing part to the fourth flowing part and the heat exchange medium introduced through the third communicating hole from the second flowing part to the fourth flowing part from each other and then discharge the heat exchange medium through fourth port.

22. A flow control valve, comprising:
a main body provided with a first port which is connected with a supplying pipe of a heat exchange medium supplying part, second and third ports which are respectively connected with first and second heat exchanging regions of a heat exchanger so that heat exchange medium introduced through the first port is independently flowed in each of the first and second heat exchanging regions, a fourth port which is connected with a discharging pipe so as to discharge the heat exchange medium bypassed and discharged from the heat exchanger, a first flowing part in which the heat exchange medium is flowed and which is communicated with a part of the first port, a second flowing part through which the fourth port is passed and which is communicated with the rest of the first port, a third flowing part which is connected with the second and third ports, a fourth flowing part which is surrounded by the first to third flowing parts and connected with the fourth port, a partition wall which partitions the first to fourth flowing parts, a first communicating hole which is formed at a portion of the partition wall defining the first and third flowing parts, a second communicating hole which is formed at a portion of the partition wall defining the first and fourth flowing parts, a third communicating hole which is formed at a portion of the partition wall defining the fourth and second flowing parts, and a fourth communicating hole which is formed at a portion of the partition wall defining the second and third flowing parts;
a first plate valve which is provided at the first flowing part so as to selectively open and close the first and second communicating holes; and
a second plate valve which is provided at the second flowing part so as to selectively open and close the third and fourth communicating holes,
wherein a fourth hollow hole is formed in the bottom of the main body for forming fourth flowing part so that the fourth flowing part and the fourth port are communicated with each other.

23. A flow control valve, comprising:
a main body provided with a first port which is connected with a supplying pipe of a heat exchange medium supplying part, second and third ports which are respectively connected with first and second heat exchanging regions of a heat exchanger so that heat exchange medium introduced through the first port is independently flowed in each of the first and second heat exchanging regions, a fourth port which is connected with a discharging pipe so as to discharge the heat exchange medium bypassed and discharged from the heat exchanger, and a partitioning means which partitions an inner space of the main body so that the heat exchange medium introduced through the first port is flowed to the second, third or fourth port, wherein the inner space of the main body is partitioned by the partitioning means into a first flowing part in which the heat exchange medium is flowed and which is communicated with a part of the first port, a second flowing part through which the fourth port is passed and which is communicated with the rest of the first port, a third flowing part which is connected with the second and third ports, a fourth flowing part which is surrounded by the first to third flowing parts and connected with the fourth port;

a first flow controlling means which controls an amount of the heat exchange medium introduced through the first port, which is flowed to the second or fourth port; and a second flow controlling means which controls an amount of the heat exchange medium introduced through the first port, which is flowed to the third or fourth port, wherein the third port is formed in a double tube type structure in which the second port is included.

24. The flow control valve of claim 23, wherein the partitioning means comprises a first partition wall for partitioning between the first and second flowing parts, a second partition wall for partitioning between the second and third flowing parts, a third partition wall for partitioning between the third and first flowing parts, a fourth partition wall which connects the first and third partition walls so as to partition between the first and fourth flowing parts and, a fifth partition wall which connects the first and second partition walls so as to partition between the second and fourth flowing parts, and a sixth partition wall which connects the second and third partition walls so as to partition between the third and fourth flowing parts, the third partition wall is formed with a first communicating hole which communicates the first and third flowing part, the fourth partition wall is formed with a second communicating hole which communicates the first and fourth flowing part, the fifth partition wall is formed with a third communicating hole which communicates the fourth and second flowing part, and the second partition wall is formed with a fourth communicating hole which communicates the second and third flowing part, the first flow controlling means is a first plate valve so as to selectively open and close the first and second communicating holes, and the second flow controlling means is a second plate valve so as to selectively open and close the third and fourth communicating holes.

25. The flow control valve of claim 24, further comprising a seventh partition wall which partitions the fourth flowing part so as to separate the heat exchange medium introduced through the second communicating hole from the first flowing part to the fourth flowing part and the heat exchange medium introduced through the third communicating hole from the second flowing part to the fourth flowing part from each other and then discharge the heat exchange medium through fourth port.

* * * * *